United States Patent
Leong et al.

(10) Patent No.: US 8,452,621 B1
(45) Date of Patent: May 28, 2013

(54) SYSTEM AND METHOD FOR DETERMINING LOSS RESERVES

(75) Inventors: Weng Kah Leong, New York, NY (US); Stephen Lienhard, East Windsor, NJ (US); Seth Shenghit, Robbinsville, NJ (US); Blake Berman, New York, NY (US)

(73) Assignee: Guy Carpenter & Company, LLC., New York, NY (US)

(*) Notice: Subject to any disclaimer, the term of this patent is extended or adjusted under 35 U.S.C. 154(b) by 0 days.

(21) Appl. No.: 13/405,006

(22) Filed: Feb. 24, 2012

(51) Int. Cl.
*G06Q 40/08* (2012.01)

(52) U.S. Cl.
CPC .................................. *G06Q 40/08* (2013.01)
USPC ............................................................. 705/4

(58) Field of Classification Search
CPC ........................................................ G06Q 40/08
USPC ............................................................. 705/4
See application file for complete search history.

(56) References Cited

U.S. PATENT DOCUMENTS 8,082,489 B2 * 12/2011 Jiang .............................. 715/212
2006/0136273 A1 * 6/2006 Zizzamia et al. ................. 705/4

OTHER PUBLICATIONS

"Application of Collective Risk Theory to Estimate Variability in Loss Reserves" Roger M. Hayne 1989.*

P.D. England et al., Stochastic Claims Reserving in General Insurance; Jan. 28, 2002, pp. 1-76.
Duncan Anderson et al., "A Practitioner's Guide to Generalized Linear Models", Section Edition, May 2005, pp. 1-116.
England et al., "Analytic and bootstrap estimates of prediction errors in claims reserving", 1999, pp. 1-13.
Riccardo Rebanato et al., "The most general methodology to create a valid correlation matrix for risk management and option pricing purposes", Oct. 19, 1999, pp. 1-12.
Shapland et al., "Bootstrap Modeling: Beyond the Basics", Casualty Actuarial Society E-Forum, Fall 2010, pp. 1-66.
Thomas Mack, "The Prediction Error of Bornhuetter-Ferguson", Casualty Actuarial Society E-Forum, Fall 2008, 21 pps.
Thomas Mack, "Distribution-Free Calculation of the Standard Error of Chain Ladder Reserve Estimates", Astin Bulletin, vol. No. 2, 1993, pp. 213-225.

* cited by examiner

*Primary Examiner* — James Vezeris
(74) *Attorney, Agent, or Firm* — Fay Kaplun & Marcin, LLP

(57) ABSTRACT

A system, method and computer readable storage medium for receiving, from a user, a selection of a model to perform a loss reserve calculation, receiving, from the user, a selection of actual data directly from a workbook of a spreadsheet application to be input into the model selected to perform the loss reserve calculation, performing a model fitting calculation based on the model selected and the actual data to generate model fitted results, performing a plurality of simulations, wherein each simulation is based on the model fitted results and random re-sampling with replacement for the actual data and generating loss reserve statistics based on the plurality of simulations.

27 Claims, 24 Drawing Sheets

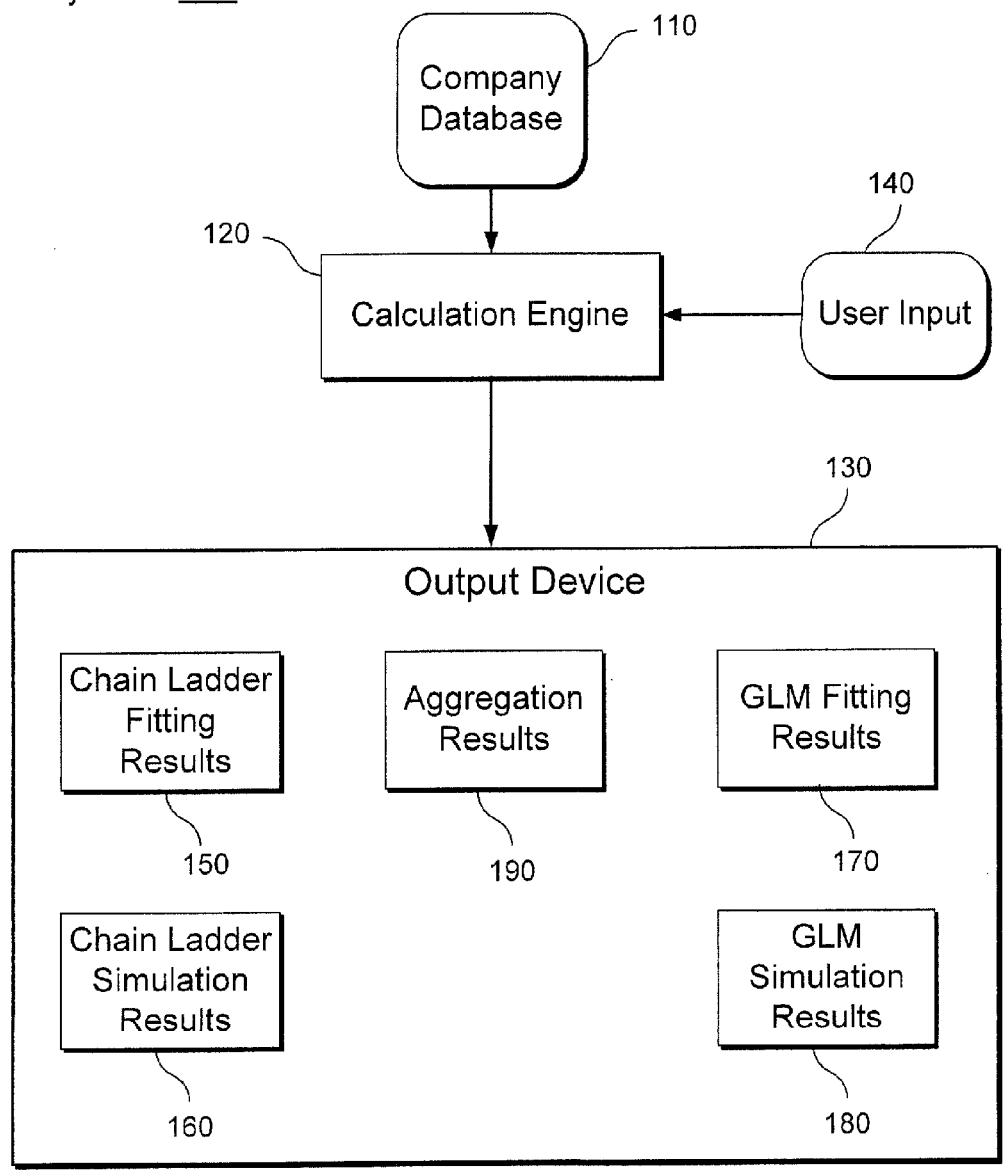
F I G. 1

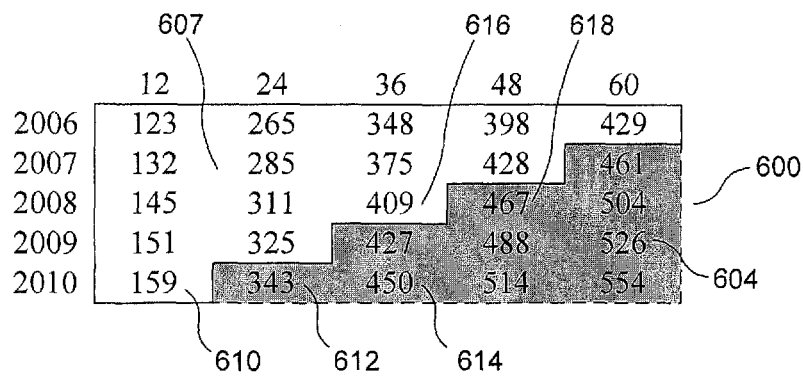
F I G. 6
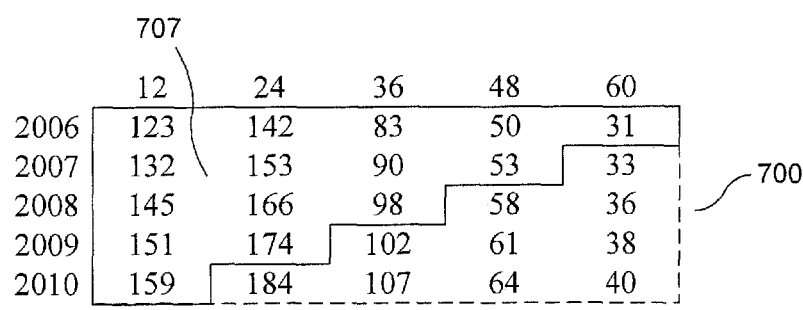
F I G. 7
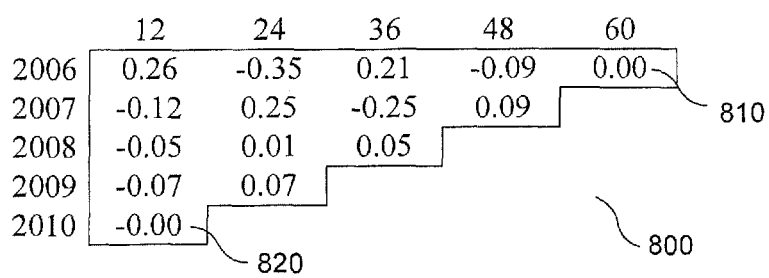
F I G. 8

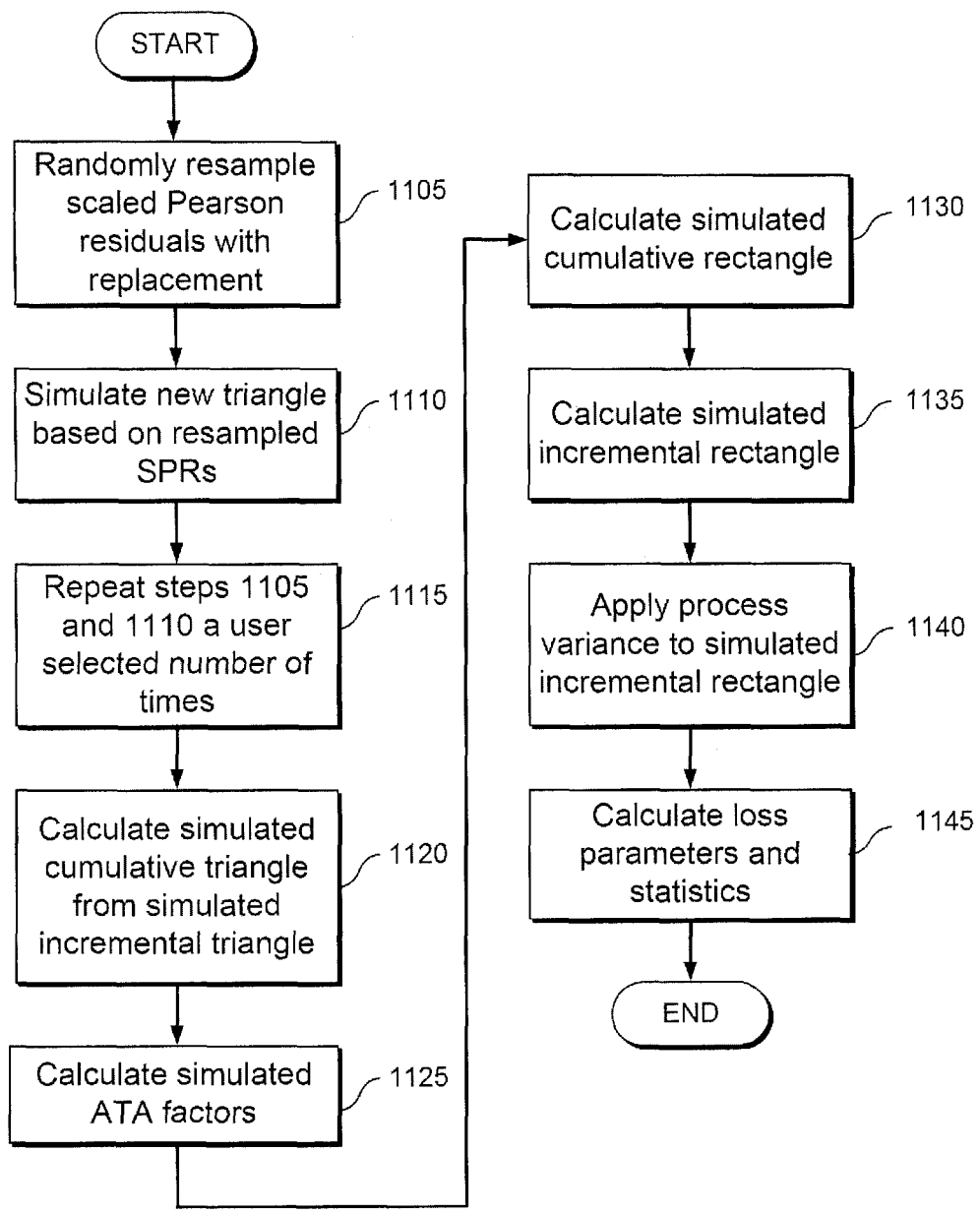
F I G. 11

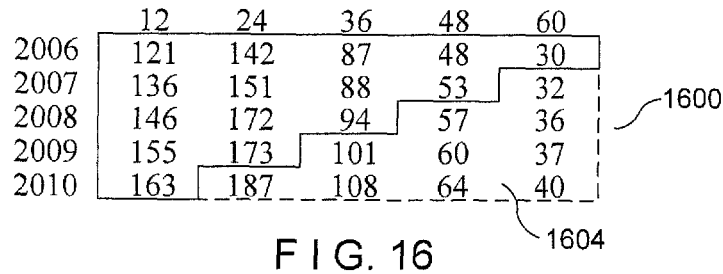
FIG. 16
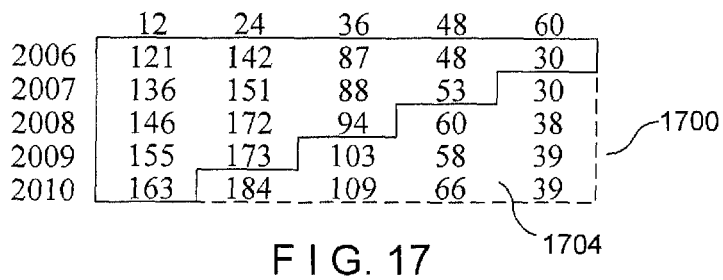
FIG. 17
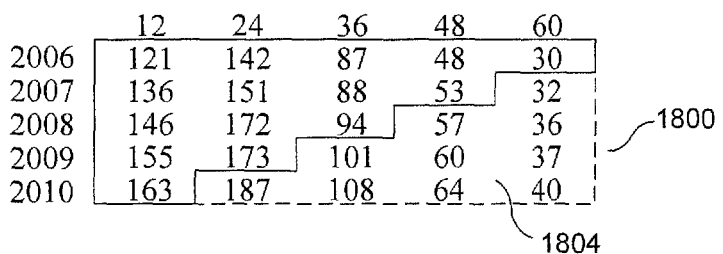
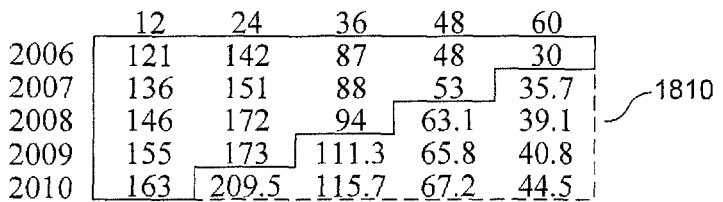
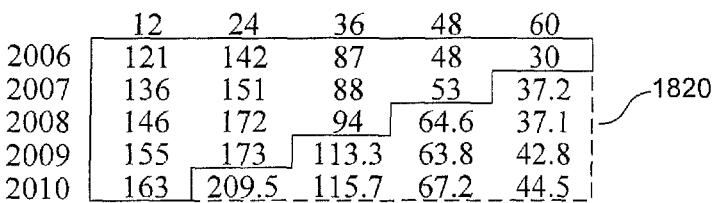
FIG. 18

|      | 12  | 24  | 36 | 48 | 60 | Tail Mean: |  |  |
|------|-----|-----|----|----|----|------|------|------|
|      |     |     |    |    |    | 1.1  | 1.05 | 1.03 |
|      |     |     |    |    |    | 72   | 84   | 96   |
| 2006 | 123 | 142 | 83 | 50 | 31 | 43   | 21   | 13   |
| 2007 | 132 | 153 | 90 | 53 | 33 | 46   | 23   | 14   |
| 2008 | 145 | 166 | 98 | 58 | 36 | 50   | 25   | 15   |
| 2009 | 151 | 174 | 102| 61 | 38 | 53   | 26   | 16   |
| 2010 | 159 | 184 | 107| 64 | 40 | 55   | 28   | 17   |

F I G. 19 (1900)

|      | 12  | 2007 / 24 | 36  | 48 | 60 | Simulated Tail |  |  |
|------|-----|-----|-----|----|----|------|------|------|
|      |     |     |     |    |    | 1.12 | 1.06 | 1.03 |
|      |     |     |     |    |    | 72   | 84   | 96   |
| 2006 | 121 | 142 | 87  | 48 | 30 | 52   | 26   | 13   |
| 2007 | 136 | 151 | 88  | 53 | 30 | 55   | 28   | 14   |
| 2008 | 146 | 172 | 94  | 60 | 38 | 61   | 31   | 15   |
| 2009 | 155 | 173 | 103 | 58 | 39 | 64   | 32   | 16   |
| 2010 | 163 | 184 | 109 | 66 | 39 | 67   | 33   | 17   |

F I G. 20 (2000)

|      | 12  | 24  | 36  | 48 | 60 | Simulated Tail |  |  |
|------|-----|-----|-----|----|----|------|------|------|
|      |     |     |     |    |    | 1.12 | 1.06 | 1.03 |
|      |     |     |     |    |    | 72   | 84   | 96   |
| 2006 | 123 | 142 | 83  | 50 | 31 | 52   | 26   | 13   |
| 2007 | 132 | 153 | 90  | 53 | 30 | 55   | 28   | 14   |
| 2008 | 145 | 166 | 98  | 60 | 38 | 61   | 31   | 15   |
| 2009 | 151 | 174 | 103 | 58 | 39 | 64   | 32   | 16   |
| 2010 | 159 | 184 | 109 | 66 | 39 | 67   | 33   | 17   |

F I G. 21 (2100)

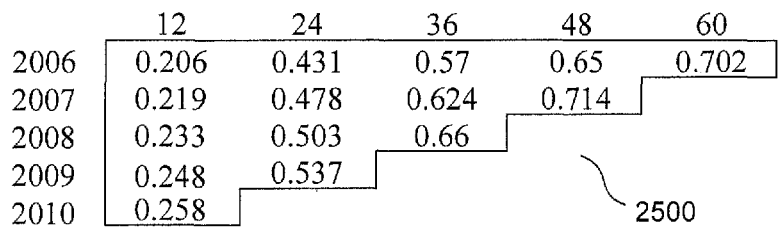
FIG. 25
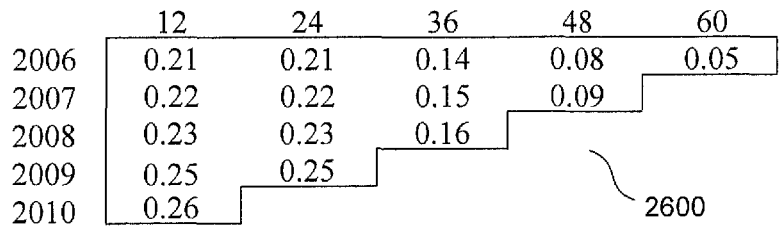
FIG. 26
| Cell # | Column # | Row # | Diag # | A1 | D2 | D3 | C2 |
|---|---|---|---|---|---|---|---|
| 1 | 1 | 1 | 1 | 1 | 0 | 0 | 0 |
| 2 | 1 | 2 | 2 | 1 | 0 | 0 | 1 |
| 3 | 1 | 3 | 3 | 1 | 0 | 0 | 2 |
| 4 | 1 | 4 | 4 | 1 | 0 | 0 | 3 |
| 5 | 1 | 5 | 5 | 1 | 0 | 0 | 4 |
| 6 | 2 | 1 | 2 | 1 | 1 | 0 | 1 |
| 7 | 2 | 2 | 3 | 1 | 1 | 0 | 2 |
| 8 | 2 | 3 | 4 | 1 | 1 | 0 | 3 |
| 9 | 2 | 4 | 5 | 1 | 1 | 0 | 4 |
| 10 | 3 | 1 | 3 | 1 | 1 | 1 | 2 |
| 11 | 3 | 2 | 4 | 1 | 1 | 1 | 3 |
| 12 | 3 | 3 | 5 | 1 | 1 | 1 | 4 |
| 13 | 4 | 1 | 4 | 1 | 1 | 2 | 3 |
| 14 | 4 | 2 | 5 | 1 | 1 | 2 | 4 |
| 15 | 5 | 1 | 5 | 1 | 1 | 3 | 4 |
FIG. 28

Exposure Levels

|  | 12 | 24 | 36 | 48 | 60 |
|---|---|---|---|---|---|
| 2006 | 0.2033 | 0.2033 | 0.2033 | 0.2033 | 0.2033 |
| 2007 | 0.2033 | 0.2033 | 0.2033 | 0.2033 | 0.2033 |
| 2008 | 0.2033 | 0.2033 | 0.2033 | 0.2033 | 0.2033 |
| 2009 | 0.2033 | 0.2033 | 0.2033 | 0.2033 | 0.2033 |
| 2010 | 0.2033 | 0.2033 | 0.2033 | 0.2033 | 0.2033 |

2907, 2900, 2904

Development Decay

|  | 12 | 24 | 36 | 48 | 60 |
|---|---|---|---|---|---|
| 2006 | 1.00 | 1.08 | 0.60 | 0.33 | 0.19 |
| 2007 | 1.00 | 1.08 | 0.60 | 0.33 | 0.19 |
| 2008 | 1.00 | 1.08 | 0.60 | 0.33 | 0.19 |
| 2009 | 1.00 | 1.08 | 0.60 | 0.33 | 0.19 |
| 2010 | 1.00 | 1.08 | 0.60 | 0.33 | 0.19 |

2917, 2910, 2914

Calendar Trend

|  | 12 | 24 | 36 | 48 | 60 |
|---|---|---|---|---|---|
| 2007 | 1.00 | 1.07 | 1.14 | 1.22 | 1.30 |
| 2008 | 1.07 | 1.14 | 1.22 | 1.30 | 1.39 |
| 2009 | 1.14 | 1.22 | 1.30 | 1.39 | 1.49 |
| 2010 | 1.22 | 1.30 | 1.39 | 1.49 | 1.59 |
| 2011 | 1.30 | 1.39 | 1.49 | 1.59 | 1.70 |

|  | 12 | 24 | 36 | 48 | 60 |
|---|---|---|---|---|---|
| 2006 | 0.2033 | 0.2354 | 0.1394 | 0.0825 | 0.0489 |
| 2007 | 0.2170 | 0.2513 | 0.1488 | 0.0881 | 0.0523 |
| 2008 | 0.2317 | 0.2682 | 0.1588 | 0.0943 | 0.0559 |
| 2009 | 0.2473 | 0.2863 | 0.1699 | 0.1009 | 0.0599 |
| 2010 | 0.2639 | 0.3063 | 0.1818 | 0.1079 | 0.0641 |

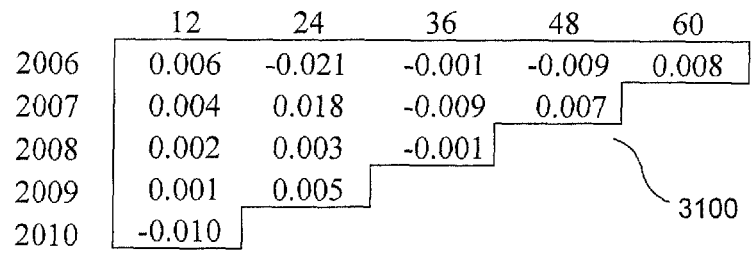
FIG. 31
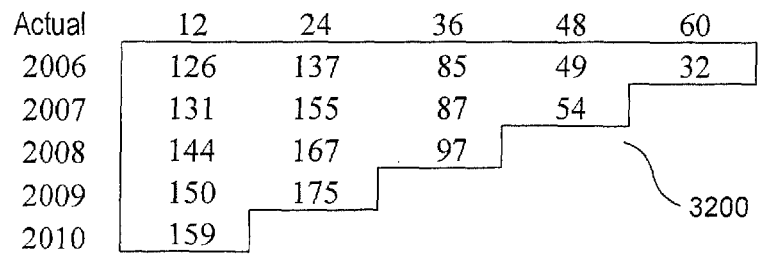
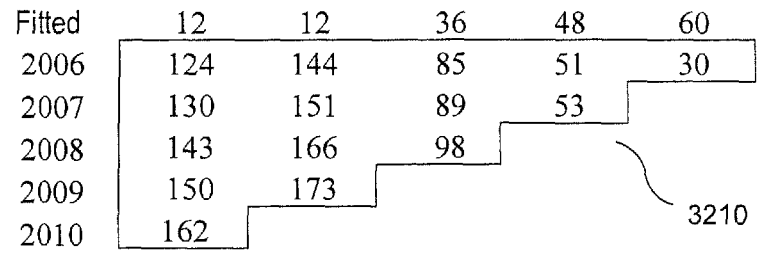
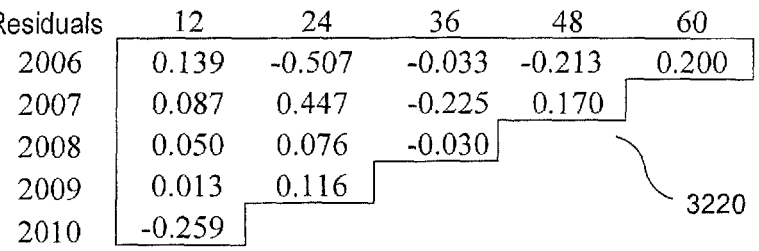
FIG. 32

Exposure Rectangle

|  | 12 | 24 | 36 | 48 | 60 |
|---|---|---|---|---|---|
| 2006 | 0.2028 | 0.2028 | 0.2028 | 0.2028 | 0.2028 |
| 2007 | 0.2028 | 0.2028 | 0.2028 | 0.2028 | 0.2028 |
| 2008 | 0.2028 | 0.2028 | 0.2028 | 0.2028 | 0.2028 |
| 2009 | 0.2028 | 0.2028 | 0.2028 | 0.2028 | 0.2028 |
| 2010 | 0.2028 | 0.2028 | 0.2028 | 0.2028 | 0.2028 |

3500

Development Decay Rectangle

|  | 12 | 24 | 36 | 48 | 60 |
|---|---|---|---|---|---|
| 2006 | 1.00 | 1.10 | 0.61 | 0.34 | 0.19 |
| 2007 | 1.00 | 1.10 | 0.61 | 0.34 | 0.19 |
| 2008 | 1.00 | 1.10 | 0.61 | 0.34 | 0.19 |
| 2009 | 1.00 | 1.10 | 0.61 | 0.34 | 0.19 |
| 2010 | 1.00 | 1.10 | 0.61 | 0.34 | 0.19 |

3510

Calendar Trend Rectangle

|  | 12 | 24 | 36 | 48 | 60 |
|---|---|---|---|---|---|
| 2006 | 1.00 | 1.06 | 1.12 | 1.19 | 1.26 |
| 2007 | 1.06 | 1.12 | 1.19 | 1.26 | 1.39 |
| 2008 | 1.12 | 1.19 | 1.26 | 1.39 | 1.47 |
| 2009 | 1.19 | 1.26 | 1.39 | 1.47 | 1.65 |
| 2010 | 1.26 | 1.39 | 1.47 | 1.65 | 1.77 |

3520

Simulated Incremental Rectangle

|  | 12 | 24 | 36 | 48 | 60 |
|---|---|---|---|---|---|
| 2006 | 124 | 144 | 85 | 50 | 29 |
| 2007 | 129 | 150 | 88 | 52 | 32 |
| 2008 | 141 | 164 | 96 | 59 | 34 |
| 2009 | 146 | 170 | 104 | 61 | 38 |
| 2010 | 157 | 189 | 111 | 69 | 41 |

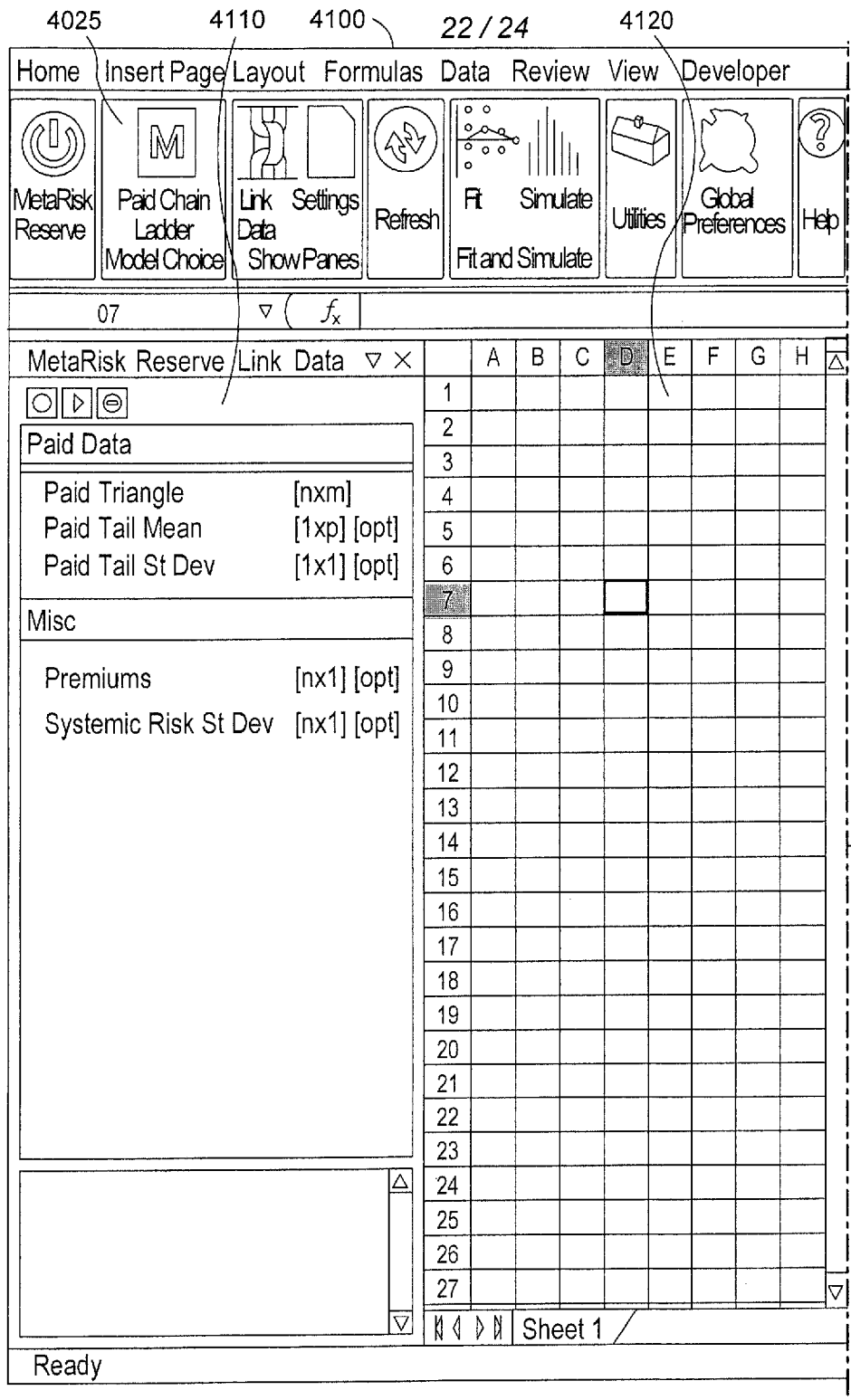
F I G. 41A

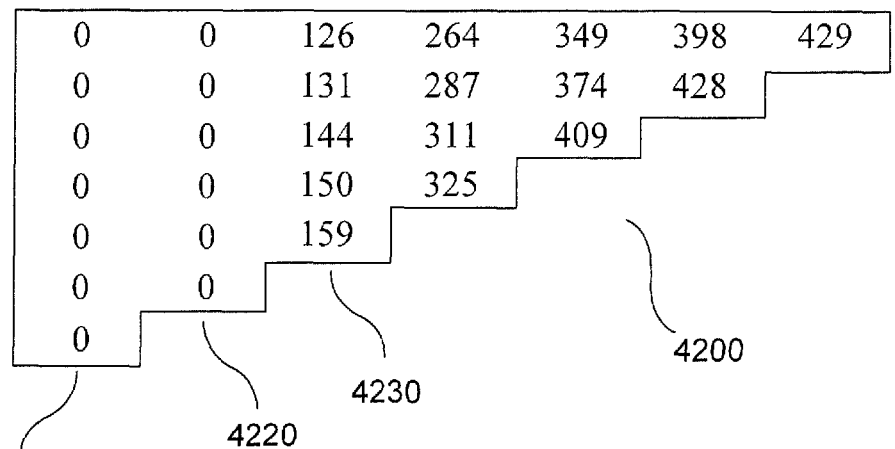
F I G. 42
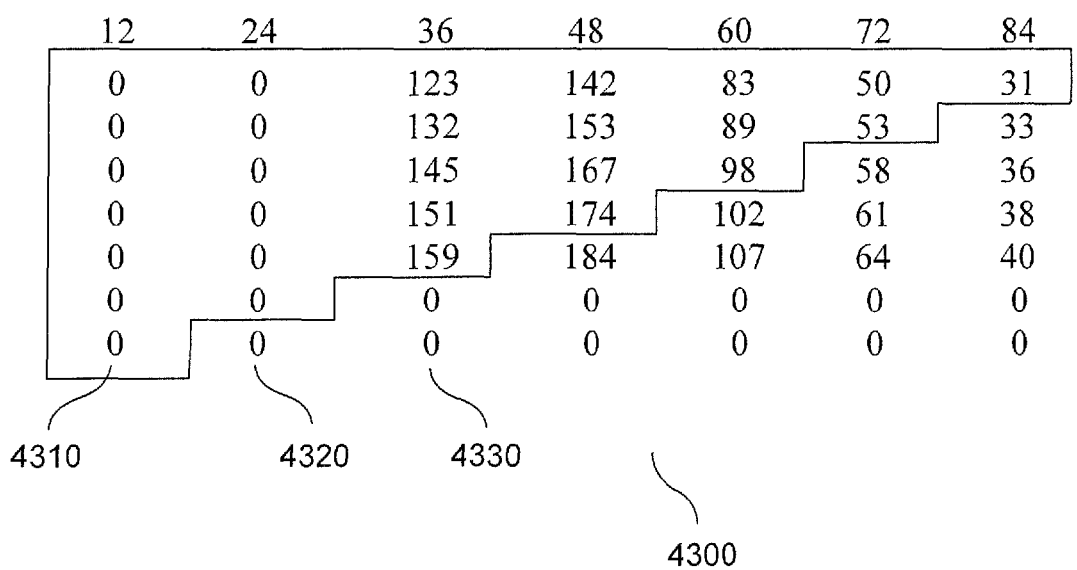
F I G. 43

SYSTEM AND METHOD FOR DETERMINING LOSS RESERVES

BACKGROUND INFORMATION

Customers of an insurance company pay the insurance company a premium to bind an insurance policy for the customer. The insurance policy allows the customer to make a claim against the insurance company for a covered amount when the customer suffers a loss specified in the insurance policy. The insurance company is generally required by law or insurance regulation to keep a certain amount of the premium payment available to pay anticipated losses. These funds that are set aside to pay later losses are referred to as loss reserves.

SUMMARY OF THE EXEMPLARY EMBODIMENTS

A computer readable storage medium storing a set of instructions executable by a processor. The instructions being operable to perform a method of receiving, from a user, a selection of a model to perform a loss reserve calculation, receiving, from the user, a selection of actual data directly from a workbook of a spreadsheet application to be input into the model selected to perform the loss reserve calculation, performing a model fitting calculation based on the model selected and the actual data to generate model fitted results, performing a plurality of simulations, wherein each simulation is based on the model fitted results and random re-sampling with replacement for the actual data and generating loss reserve statistics based on the plurality of simulations.

A method for receiving, from a user, a selection of a model to perform a loss reserve calculation, receiving, from the user, a selection of actual data directly from a workbook of a spreadsheet application to be input into the model selected to perform the loss reserve calculation, performing a model fitting calculation based on the model selected and the actual data to generate model fitted results, performing a plurality of simulations, wherein each simulation is based on the model fitted results and random re-sampling with replacement for the actual data and generating loss reserve statistics based on the plurality of simulations.

A system having a memory configured to store a plurality of models to perform a loss reserve calculation and a workbook of a spreadsheet application including actual data, an input device configured to receive inputs from a user, the inputs including a selection of one of the plurality of models to perform the loss reserve calculation and a selection of a portion of the actual data directly from the workbook and a processor configured to receive the selections from the input device and perform a model fitting calculation based on the model selected and the actual data to generate model fitted results, the processor further configured to perform a plurality of simulations, wherein each simulation is based on the model fitted results and random re-sampling with replacement for the actual data and generate loss reserve statistics based on the plurality of simulations.

BRIEF DESCRIPTION OF THE DRAWINGS

FIG. 1 shows an exemplary system for calculating the loss reserves.

FIG. 6 shows an exemplary cumulative fitted rectangle triangle for an insurance company.

FIG. 7 shows an exemplary incremental paid fitted rectangle for an insurance company.

FIG. 8 shows an exemplary unscaled Pearson residuals triangle for an insurance company.

FIG. 11 shows an exemplary chain ladder simulation calculation.

FIG. 16 shows an exemplary simulated incremental loss rectangle for an insurance company.

FIG. 17 shows an exemplary simulated incremental loss rectangle with a process variance applied for an insurance company.

FIG. 18 shows an exemplary simulated incremental loss rectangle, an exemplary simulated incremental loss rectangle with systemic risk applied and an exemplary simulated incremental loss rectangle with systemic loss and a process variance applied and for an insurance company.

FIG. 19 shows an exemplary incremental paid fitted rectangle with a tail applied for an insurance company.

FIG. 20 shows an exemplary simulated incremental fitted rectangle with a tail applied for an insurance company.

FIG. 21 shows a combination of the exemplary simulated incremental fitted rectangle of FIG. 20 and the exemplary incremental paid fitted rectangle of FIG. 19.

FIG. 25 shows an exemplary exposure adjusted cumulative actual paid loss triangle for an insurance company.

FIG. 26 shows an exemplary exposure adjusted incremental actual paid loss triangle for an insurance company.

FIG. 28 shows an exemplary design matrix based on the fitted triangle of FIG. 27.

FIG. 29 shows an exemplary exposure level rectangle, development decay rectangle and calendar trend rectangle for an insurance company.

FIG. 30 shows an exemplary incremental fitted rectangle calculated from the rectangles of FIG. 29.

FIG. 31 shows an exemplary deviance residual triangle for an insurance company.

FIG. 32 shows an exemplary unscaled Pearson residuals triangle for an insurance company.

FIG. 35 shows an exemplary exposure level rectangle, development decay rectangle, calendar trend rectangle and simulated incremental rectangle for an insurance company.

FIG. 41A shows a first portion of an exemplary spreadsheet view having a link data pane, a spreadsheet pane and a settings pane.

FIG. 42 shows an exemplary cumulative loss triangle including an edge case of missing columns of data.

FIG. 43 shows an exemplary incremental fitted rectangle based on the cumulative triangle of FIG. 42.

DETAIL DESCRIPTION OF THE EXEMPLARY EMBODIMENTS

Figure 2:
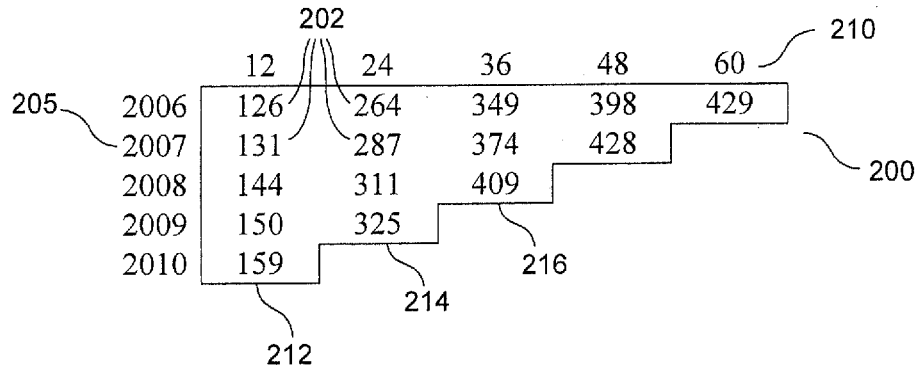
FIG. 2 shows an exemplary cumulative actual paid loss triangle for an insurance company.

The exemplary embodiments may be further understood with reference to the following description of the exemplary embodiments and the related appended drawings, wherein like elements are provided with the same reference numerals. The exemplary embodiments are related to systems and methods for determining loss reserves for insurance companies. It is noted that while loss reserves are normally related to the insurance industry and insurance companies, it may be that other industries and/or companies also have a need to determine loss reserves such as non-insurance companies that self-insure or that there are comparable types of data used for other purposes such as payouts from pension plans where the technical term may not be loss reserves, but the concept of the amount of money that needs to be held back to pay future claims may be the same. Thus, while the terms "insurance," "insurance company," and "loss reserves" are used throughout the examples provided herein, those skilled in the art will understand that the exemplary systems and methods may be applied to products other than insurance and/or by companies or entities other than insurance companies. In addition, the exemplary calculations provided herein are generally referred to as "loss reserve calculations." These loss reserve calculations may include the calculation of the estimate of the loss reserve and/or the calculation of the distribution around the loss reserve estimate.

As described briefly above, insurance companies write insurance policies for customers and collect premiums from the customers in exchange for binding the insurance covered by each policy. The insurance policy allows the customer to make a claim against the insurance company for a covered amount when the customer suffers a loss specified in the insurance policy. The premiums collected by the insurance company are not only used to pay future claims, but are also used to pay the operating expenses of the insurance company (e.g., employee salaries, rent, taxes, etc.) and distribute profits to owners of the company (e.g., shareholders). While it is generally in the best interest of the insurance company to have an adequate amount of loss reserves on hand to pay the claims of its customers, most jurisdictions have adopted laws and/or regulations to positively require that an insurance company have the proper amount of loss reserves. For example, in New York State, N.Y. ISC. LAW §4117: Loss and loss expense reserves, provides the general rule for loss reserves for insurance companies operating in the state.

While these laws and/or regulations impose a requirement on the insurance company, they do not and cannot provide the exact amount of money that is to be included in the loss reserves. This is because there is no crystal ball to tell the insurance company exactly how many claims are going to be made in the future and how much money these claims are going to cost. Thus, even the laws and regulations governing the loss reserves need to define the loss reserve amount based on estimations of these items. For example, the above cited New York State law states the loss reserves should include "the aggregate amounts of liability for all losses and loss expenses incurred but on which no notice has been received, estimated in accordance with the company's prior experience." Thus, to comply with this particular law, the company must make loss reserve estimations based on the company's prior experience (or if the company does not have prior experience, the experience of similarly situated companies). Other laws and regulations have the same general requirements.

Besides compliance with various laws and regulations, it is in the insurance company's best interest to have the most accurate prediction for loss reserves because the company wants neither too little nor too great a loss reserve. A loss reserve that is too small could result in insolvency, in a worst case, or a loss of faith in the insurance company by investors and customers. A loss reserve that is too large may mean that the insurance company may not be using the premiums it is collecting in the most efficient manner. For example, money that is being held in loss reserve that is not needed could be employed in other pursuits such as expanding business, transferring profits to shareholders, etc. Thus, the insurance company wants to have the most accurate estimation of the loss reserves required for the policies that it has written. The systems and methods of the exemplary embodiments may be used to calculate the loss reserves to fulfill the insurance company's legal requirements and general business requirements to have an accurate estimate of the amount the insurance company will need to pay for claims made against the policies it has written.

FIG. 1 shows an exemplary system 100 for calculating the loss reserves for an insurance company. The system 100 includes a company database 110 storing information for the insurance company. The information for the insurance company may be input from any number of sources available to the insurance company. In one example, a source of the information included in the company database 110 may be from annual statement Schedule P filings. However, depending on the type of information systems that the insurance company has in place, the system 100 may source the information in the company database 110 from any of the company's information systems. It is also noted that the company database 110 may be distributed at multiple locations or may be a virtual database that has access to information stored in other systems. Examples of the type of information that is stored in the company database 110 will be provided below when describing the sample calculations for determining the loss reserves for the company. However, this information is actual company data based on the company's operating experience, e.g., to comply with the requirement that the loss reserves are based on the company's experience. As with any information that is generated from actual historical data, the more relevant data that is stored in the company database 110, the more likely that the loss reserve calculations will provide useful information to the users of the system 100.

The system 100 also includes a user input component 140. The user input component 140 may be an actual physical component for providing user input such as a keyboard, mouse, touch screen, etc. or may also be a logical component such as a database or other memory that stores user preferences, etc. Throughout the below description of the exemplary calculations, there will be numerous examples of optional or required user input or selections. Such user input or selections may be received via the user input component 140.

The system 100 also includes a calculation engine 120 that performs the calculations on the actual data stored in the company database 110. The calculations performed by the calculation engine 120 will be described in greater detail below, but, in general, the actual data from the company database is analyzed using a chain ladder model or a generalized linear model (GLM) that is a flexible generalization of ordinary linear regression. The results of the calculations are an estimate of possible loss reserves that a user of the system 100 may then use to determine the booked loss reserves that the company will account for. That is, as will be described in greater detail below, the calculation engine 120 will not provide a single answer to the question of how much should the loss reserves be, but rather will provide a range of answers based on different simulations. These answers may be averaged, may be ranked by percentile, etc. However, the booked value for the loss reserve selected by the insurance company will be a value that is vetted and decided on by the individuals in the corporate structure of the insurance company. The system 100 is meant to be a tool that provides these individuals with more information to select the proper loss reserve.

The calculation engine 120 will provide the results of the loss reserve calculations to an output device 130 for use by the user. The output device 130 may be, for example, a display device, a printer, etc. As shown in FIG. 1, the output device 130 is illustrated as showing various outputs. In this example, the outputs include chain ladder fitting results 150, chain ladder simulation results 160, GLM fitting results 170, GLM simulation results 180 and aggregation results 190. These outputs will be described as the calculations for determining the outputs are described below. However, in general, each of these outputs or results is directed at the results of loss reserve calculations. Also, the exemplary calculations described below include multiple intermediate steps between the actual data input from the company database 110 and the results of the calculations by the calculation engine 120 that are provided by the output device 130. In general, it is anticipated that any results of these intermediate steps are not available to the user of the system 100. However, if for some reason, such results of intermediate steps would be useful to the user of the system, those skilled in the art will understand that providing the intermediate results to users via the output device 130 may be accomplished in the same manner as providing the final results to the user.

Thus, FIG. 1 provides a general overview of a system 100 that may be used to calculate the loss reserves for an insurance company. However, prior to describing the exemplary loss reserve calculations, some examples of various hardware devices and/or software components that may be utilized to embody the system 100 of FIG. 1 will be described. In one embodiment, the calculation engine 120 may be embodied as a processor executing lines of code that operates to perform the calculations described herein. For example, the system 100 may be embodied on a personal computer having a memory storing the company database 110 and instructions for performing the calculations of the calculation engine 120, a processor for executing the instructions stored in the memory and a display device to receive the results of the calculations from the processor to display to a user. The processor may be, for example, one of the Intel families of processors (e.g., Pentium, Xeon, Celeron, Itanium, etc.), commonly used in PCs and Apple Mac computers.

It is noted that some of these processors may be multi-core processors and the exemplary embodiments may be optimized for use on the multi-core processors. For example, the exemplary calculations described below may be broken up between the cores to produce results in a faster manner than serial processing within a single core. The manner of breaking the calculations into specific streams may be individual to the programmer that is writing the software to perform the calculation, but certain principles may apply to allow the breaking up of the calculations. For example, each random resampling with replacement may be assigned to a different core. The exemplary embodiments utilize multiple processors and cores on a single desktop computer. The algorithm is adaptive, in that it automatically adjusts how it distributes its jobs to an individual processor. If one of the processors is taking longer to run a calculation, it will shift to increasing the utilization of the other processors. Another unique feature of the parallel processing is the ability of the engine to perform certain calculations over all the iterations. This allows calculations such as running totals over all the computation to be split over the different processors.

In addition, the personal computers may execute a software program such as a spreadsheet program (e.g., Excel) to perform the loss reserve calculations. As will be described in greater detail below, the exemplary calculations performed by the calculation engine 120 are described with reference to loss triangles and rectangles that are composed of multiple cells. The cells of these loss triangles and rectangles may be embodied as the cells of a spreadsheet program with the calculations performed on the cells being embodied in the formulas underlying each of the cells. However, it is noted this implementation is only exemplary and the calculation engine 120 may be embodied in any hardware, software or combination thereof.

Moreover, the use of a personal computer is also only exemplary. For example, the system 100 may be embodied on a server computer (or multiple networked devices) to which users have network or Internet access. Thus, a user may remotely access the system 100 to perform the loss reserve calculations. As noted above, the calculations that are described below may be optimized for use on a multi-core processor that is used in a personal computer. Those skilled in the art will understand that server computers may also be multi-core computers, but the optimization for server computers would be different from the optimization used for a personal computer.

The exemplary system 100 may perform the loss reserve calculations in any number of manners. To provide specific examples, two manners of performing the loss reserve calculations will be described herein, a chain ladder model and a generalized linear model (GLM). Those skilled in the art will understand that the present invention is not limited to performing the loss reserve calculations by the chain ladder model and/or GLM. These calculations are merely provided as examples to illustrate the general proposition of determining loss reserves. For example, other calculations may include an incurred chain ladder model, a Bornhuetter Ferguson model, a Cape Cod model, etc. Those skilled in the art will also understand that the described calculations, e.g., chain ladder model and GLM may be performed singly and independently to determine the loss reserves for the company or they may also be performed in a complementary manner so that the results of the different calculation methods may be compared. The user may then determine the result of the different loss reserve calculations with which they feel most comfortable and use this result for the company's loss reserves. Again, since two exemplary methods are described herein, the comparison may be between the results of the two described calculations. However, if other loss reserve calculation methods are used, the results of these other methods may also be compared.

Prior to describing the specific exemplary calculations, the data that is input into the calculation engine 120 from the company database 110 that is common to both of the exemplary calculations will be described. In the two provided examples, the input data will be a simple 5×5 cumulative loss triangle 200 as illustrated in FIG. 2. As briefly described above, the cumulative loss triangle 200 comprises a series of cells 202 that have actual experience data for the insurance company. In particular, the triangle 200 shows the actual cumulative loss over the time span covered by the triangle 200. The axis 205 shows the accident year (2006-2010), while the axis 210 shows the development years in 12-month increments. For example, column 212 shows the loss for the first 12 months after the listed accident years (2006-2010). Thus, for the accident year 2007, the company has experienced an actual loss of 131 after 12 months (development year 1). For this example, the actual loss is described as a valueless term, but those of skill in the art will understand that losses are a monetary figure. Thus, the units for the values in the cells 202 of the triangle 200 may be, for example, millions of US$, thousands of euros, etc. However, for purposes of description the convention of stating the loss as a valueless term will be maintained throughout this description.

Similarly, the column 214 shows the loss for the first 24 months (the first two development years) for each accident year (2006-2010). Carrying through with the above example, for accident year 2007, the company has experienced an actual loss of 287. As described above, the triangle 200 is a cumulative loss triangle. Thus, the loss of 287 is the loss for the first 24 months. As can be seen, in this example, the data for the insurance company that is stored in the company database 110 does not include data for 24 months after accident year 2010 (e.g., the data in company database 110 is current as of Dec. 31, 2010). Thus, the accident year 2010 does not have any entry for the 24-month loss in the column 214 because no such data exists as of the current time. Similarly, the accident year 2009 does not have any entry for the 36-month loss in the column 216 because this data does not exist. Thus, in the present examples, it is considered that the company database 110 includes 60 months of actual loss payments for accident year 2006, with each subsequent accident year having one less year of actual loss data, thereby resulting in the 5×5 loss triangle 200. As will be described in greater detail below, one result of the loss reserve calculations will fill in the missing cells of the 5×5 loss triangle to generate a 5×5 loss rectangle.

There are several notes concerning the exemplary actual data that is stored in the company database 110 and embodied as loss triangle 200. Those skilled in the art will understand that any sized triangle may be used based on the number of accident years for which the company has actual loss data. As described above, the more relevant data stored in company database 110, the more likely that the calculation engine 120 would determine an accurate loss reserve. As will be described in greater detail below, the loss reserve calculations include simulations of multiple scenarios. Thus, as more actual data is provided, the complexity of the loss reserve calculations is increased, thereby resulting in increased calculation times. However, it has been determined that the exemplary embodiments running as a spreadsheet program on a personal computer are quite capable of speedily performing the described loss reserve calculations on a large quantity of data. For example, it has been determined that for meaningful results, triangle size should generally be larger than 6×6 with no practical limit in the model for triangle size. The optimal number of simulations is between 10,000 and 50,000, and currently the model limits the user to performing a maximum of 50,000 simulations.

It is also noted that the actual loss, in addition to being valueless in these examples, is not attributed to any specific product line. This is because the loss reserve calculations described herein are generic to all product lines, e.g., auto, homeowners, general liability, etc. However, the loss reserve calculation for each product line should be determined individually. The company database 110 should include the actual loss data on a per product line basis to perform the loss reserve calculations. Thus, the actual loss triangle 200 may be considered to be the actual loss data stored in the company database 110 for a single product line (e.g., general liability insurance). As will be described in greater detail below, the results of the loss reserve calculations for any product line may be later aggregated with one or more other product lines by the calculation engine 120 to provide an aggregated loss reserve.

Finally, it should be understood that the actual loss data stored in the company database 110 and the subsequent loss reserve calculations described herein may be performed on time scales that are different than one year (12 months). However, since insurance companies are generally required to report loss reserves (and other associated information) based on calendar and/or fiscal years, this is the most common time scale for the calculations to be performed.

In the following description of the exemplary calculations, in some instances, the formulas associated with the sample calculations will be provided. In other instances, only the sample calculations will be provided because the formulas for generating the sample calculations are self-evident from the sample calculations. It is also noted that the figures and tables provided with the exemplary calculations show various values. These values were generated based on the sample actual data as shown in triangle 200. The sample calculations were carried out using the Excel spreadsheet program on a personal computer and the triangles, rectangles and tables are the results of various steps of the calculations. However, it is noted that since the values included in many of these triangles, rectangles and tables are the results of intermediate steps of the exemplary calculations, the values may have certain rounding errors because of the limitation of displaying a limited number of significant digits in this description.

The chain ladder model and the GLM each have two basic steps included in the calculation. The first step is a fitting step that fits a complete rectangle from the actual loss triangle (e.g., loss triangle 200). The second step is a simulation step where the values determined by the fitting step are modified to simulate a user selected number of simulations that may then provide the user with a statistically significant amount of loss reserve data on which to base the ultimate loss reserve decision.

Figure 3:
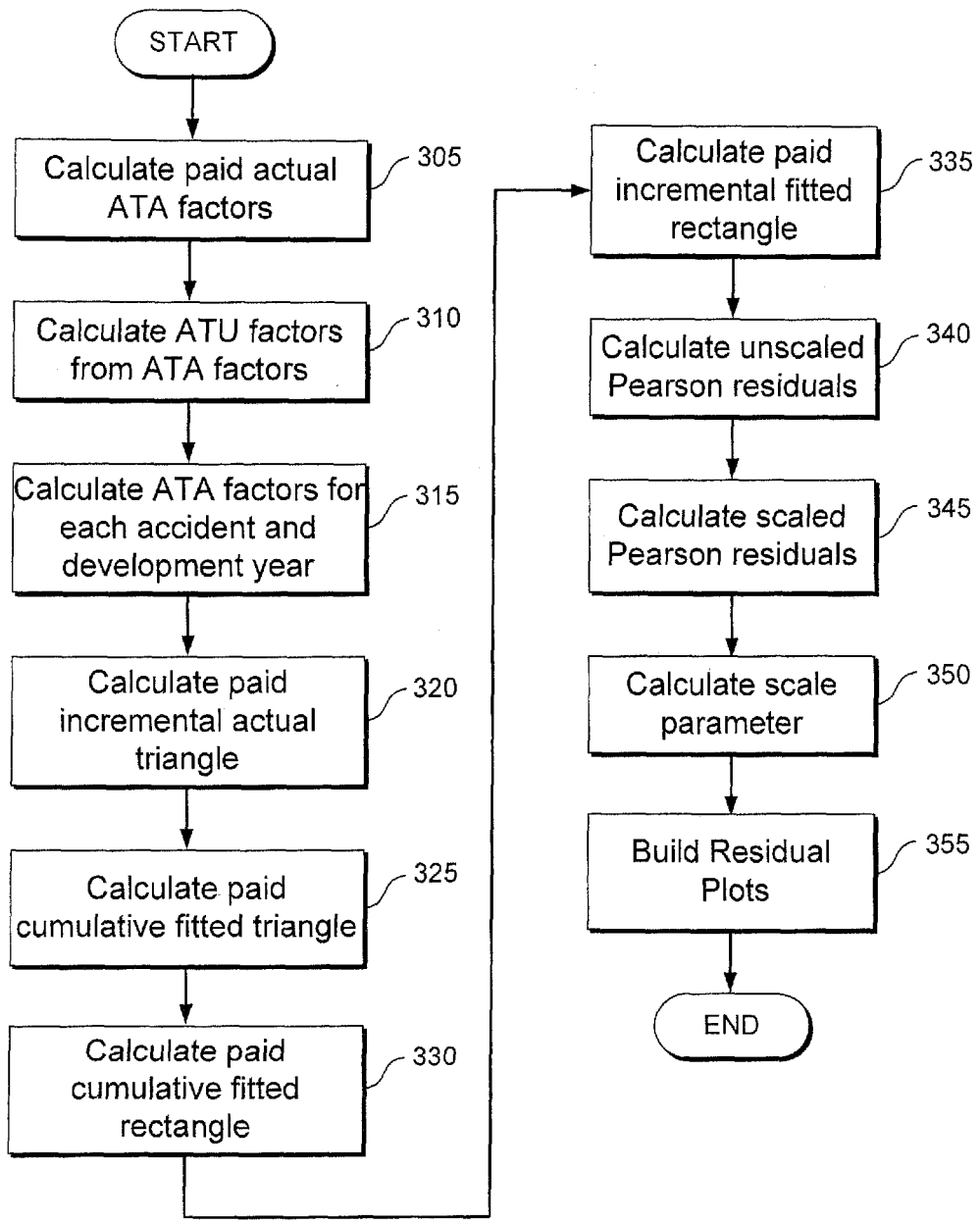
FIG. 3 shows an exemplary chain ladder fitting calculation.

Initially, the chain ladder fitting calculations will be described with reference to the exemplary method 300 illustrated by FIG. 3. In a first step 305, actual average age-to-age (ATA) factors may be calculated based on the actual loss data provided in triangle 200 of FIG. 2. The actual average ATA factors for the data presented in FIG. 2 are as follows:

| Paid Actual Average ATA: All Years | | | | |
|---|---|---|---|---|
| 12-24 | 24-36 | 36-48 | 48-60 | 60-Ult |
| 2.154 | 1.313 | 1.142 | 1.078 | 1.000 |

The ATA factors are calculated by summing the losses for a particular development year and dividing the results by the summation of the losses for the previous development year (for the previous development year, the loss from the most current accident year is not included in the summation). Thus, the actual ATA factor calculation for 12-24 months is:

(Sum of 24 month losses)/(Sum of 12 month losses)
(264+287+311+325)/(126+131+144+150)=2.154

In a next step 310, the ATA factors are cumulated to generate age-to-ultimate (ATU) factors. The ATU factors allow the determination of the loss from a development year to the ultimate loss. In this particular example, it is considered that the ultimate loss will occur after five years of development (60 months). However, as will be described in greater detail below, the exemplary calculations may extend the ultimate loss time period by extra development years based on the use of a tail. However, for the present discussion, it will be considered that the ultimate loss will occur after the fifth year of development. The ATU factors for the data presented in FIG. 2 are as follows:

| Paid Actual Average ATU Factors: All Years | | | | |
|---|---|---|---|---|
| 12-Ult | 13-Ult | 14-Ult | 15-Ult | 16-Ult |
| 3.484 | 1.617 | 1.231 | 1.078 | 1.000 |

The formula for calculating the ATU factors and an exemplary calculation for the ATU 12-Ult factor is:

$$ATU_{n-ult} = \prod_{n}^{ult} ATA_{n-(n+12)}$$

$$ATU_{12-ult} = ATA_{12-24} * ATA_{24-36} * ATA_{36-48} * ATA_{48-60} * ATA_{60-ult}$$

$$ATU_{12-ult} = 2.154 * 1.313 * 1.142 * 1.078 * 1.000 = 3.484$$

$ATU_{n-ult}$ = age to ultimate factor for month $n$ $ATA_{n-(n+12)}$ = age to age factor from month $n$ to $n + 12$ In the next step 315, the individual paid ATA factors for each accident year and development year are calculated. This factor is calculated based on each individual accident and development year. Thus, the individual paid 12-24 ATA factor for accident year 2006, the calculation is 2006(24 month loss)/2006 (12 month loss)=264/126=2.095. The complete set of individual paid ATA factors for the data presented in FIG. 2 are as follows:

| Individual Paid Actual ATA Factors | | | | |
|---|---|---|---|---|
|  | 12-24 | 24-36 | 36-48 | 48-60 |
| 2006 | 2.095 | 1.322 | 1.140 | 1.078 |
| 2007 | 2.191 | 1.303 | 1.144 |  |
| 2008 | 2.160 | 1.315 |  |  |
| 2009 | 2.167 |  |  |  |
| 2010 |  |  |  |  |

Figure 4:
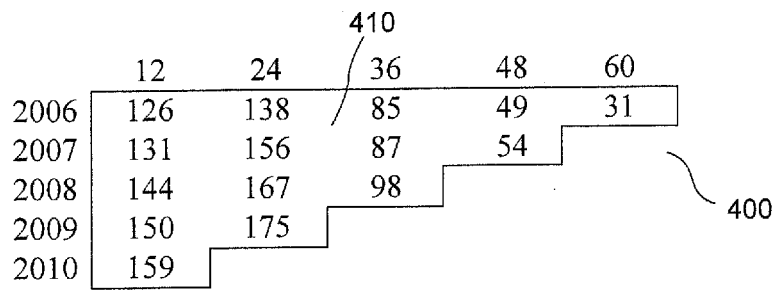
FIG. 4 shows an exemplary incremental actual paid loss triangle for an insurance company.

In step 320, a paid incremental actual triangle 400 as shown in FIG. 4 is calculated based on the values of the triangle 200. The triangle 400 is not cumulative as triangle 200, but rather shows the individual loss within each development year. For example, as shown in FIG. 2, the cumulative loss for accident year 2007 after 24 months of development is 287. However, the incremental loss in only the second year of development (e.g., 13-24 months) is 287−131=156 as shown in the cell 410 of triangle 400.

Figure 5:
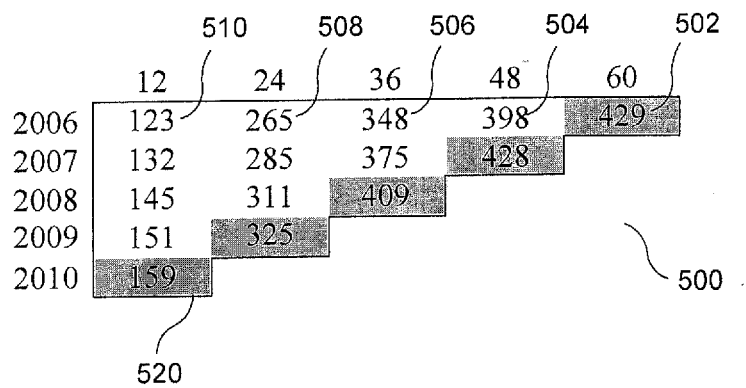
FIG. 5 shows an exemplary cumulative fitted triangle for an insurance company.

In the next step 325, a calculated paid cumulative fitted triangle 500 as shown in FIG. 5 is calculated based on the triangle 200 and the actual average ATA factors calculated above (Table—Individual Paid Actual ATA Factors). The calculations for the year 2006 will be detailed to provide an understanding of the calculated triangle 500. The cumulative loss after the 60-month development period shown in cell 502 as 429 is the base value. The 48 month value of 398 as shown in cell 504 is calculated based on the 60 month value of 429 divided by the actual average ATA factor for 48-60 months of 1.078. The 36 month value of 348 as shown in cell 506 is calculated based on the 48 month value of 398 divided by the actual average ATA factor for 36-48 months of 1.142. The 24 month value of 265 as shown in cell 508 is calculated based on the 36 month value of 348 divided by the actual average ATA factor for 24-36 months of 1.313. Finally, the 12 month value of 123 as shown in cell 510 is calculated based on the 24 month value of 265 divided by the actual average ATA factor for 12-24 months of 2.154. The remainder of the triangle 500 is calculated in the same manner.

As described above, the exemplary calculation is being performed using exemplary data and this data is generally idealized to illustrate the calculation. However, in reality, there may be cases where the data is not idealized. In general, an edge case may be described as a situation when the data is not a perfectly symmetrical triangle that has only positive incremental losses. The exemplary embodiments should be able to handle these non-idealized or edge cases. Throughout this description, several example edge cases will be described and the handling of these edge cases will be described to provide those skilled in the art the general concepts for dealing with edge cases. Thus, it should be understood that the example edge cases are not the only possible edge cases, and any additional edge cases may be dealt with in a manner consistent with the principles described herein for the example edge cases.

In a first example of an edge case, if a value is missing from a cell of the paid cumulative triangle 200, then the corresponding cell in the paid incremental actual triangle 400 and the cell to the right of this corresponding cell will also be missing. Consequently, the manner described above for calculating the actual average ATA factor is not possible because of the missing values. Thus, the ATA factors will be calculated by excluding the same missing values from the summation in the numerator and denominator. However, in some cases, there may be too much data missing for the calculation to be performed effectively. The exemplary embodiments will recognize where there is too much missing data and provide the user with an indication of the missing data.

In another example of an edge case, column(s) of zeros at the beginning of the triangle would result in infinite ATA factors as would be apparent from the above formulas. The model needs to adjust these ATA factors to account for the fact that these are modeled correctly as zeroes. To provide a specific example, FIG. 42 shows an exemplary cumulative loss triangle 4200 including an edge case of columns 4210 and 4220 of all 0 data. FIG. 43 shows an exemplary incremental fitted rectangle 4300 based on the cumulative triangle 4200 of FIG. 42. When calculating the ATA factors as described above, this exemplary data will result in some calculations of the form Non-Zero Loss/0, e.g., when dividing the values of column 4230 by the values of column 4220. This is returned as "inf" in the fitted output ATA factors as shown in the below ATA factor tables. In the case of multiple columns of 0's, e.g., when dividing the values of column 4320 by the values of column 4310, 0/0 is undefined, so it is output as blank in the ATA factors as also shown in the below ATA factor tables. When calculating the fitted rectangle 4300, any 0*x inf calculations will be forced to return 0.

| Paid Actual Age to Age Factors | | | | | | |
|---|---|---|---|---|---|---|
| 12-24 | 24-36 | 36-48 | 48-60 | 60-72 | 72-84 | 84-96 |
|  | Inf | 2.095 | 1.322 | 1.140 | 1.078 |  |
|  | Inf | 2.191 | 1.303 | 1.144 |  |  |
|  | Inf | 2.160 | 1.315 |  |  |  |
|  | Inf | 2.167 |  |  |  |  |
|  | Inf |  |  |  |  |  |

| Paid Actual Average Age to Age Factors: All Years | | | | | | |
|---|---|---|---|---|---|---|
| 12-24 | 24-36 | 36-48 | 48-60 | 60-72 | 72-84 | 84-Ult |
| Inf | Inf | 2.154 | 1.313 | 1.142 | 1.078 | 1.000 |

In another example of an edge case, there may be triangles that are missing rows at the bottom. For example, when a company stops selling policies there would be no new accident years, but the claims for policies sold in prior years still need to be paid. In such a case, the triangle is known as a runoff triangle. The exemplary embodiments allow for the input of runoff triangles, and in this case will base all calculations off of only the data that is available. For example, if in FIG. 5, the accident year 2010 was missing, the user may select the runoff triangle (excluding accident year 2010) and run the calculations based only on this data.

In the case of missing or non-credible data for older calendar years, the user may choose to only use data from the most recent calendar years. An example of when this may be useful is if a company's claims department changed their handling of claim payment or reserving 4 years ago, the claim payment information collected before that change may no longer be predictive. In this case the exemplary embodiments allow only the last 4 diagonals be used to calculate the average ATA factors, and residuals to only be sampled from these calendar years for simulating.

In step 330, a paid cumulative fitted rectangle 600 as shown in FIG. 6 is calculated. This rectangle 600 is calculated using the triangle 500 and the actual average ATA factors calculated above (Table-Paid Actual Average ATA: All Years). The upper left portion 607 of the rectangle 600 is a copy of the triangle 500. The values in the cells of the lower right hand portion 604 of the rectangle are calculated based on the highlighted values in the diagonal 520 of the triangle 500 and the actual average ATA factors. For example, the actual loss after 12 months of development for accident year 2010 is 159 as shown in cell 610. This value is multiplied by the actual average ATA factor for 12-24 months of 2.154 to result in the 24-month development value of 343 in the cell 612. This may be continued to determine the 36-month of development value for accident year 2010. The 24-month value 343 in cell 610 is multiplied by the actual average ATA factor for 24-36 months of 1.313 to result in the 36-month development value of 450 in the cell 614. Similarly, the actual cumulative loss after 36 months of development for accident year 2008 is 409 as shown in the cell 616. This value is multiplied by the actual average ATA factor for 36-48 months of 1.142 to result in the 48-month development value of 467 as shown in the cell 618. The remainder of the rectangle 600 is calculated in the same manner.

In the next step 335, a paid incremental fitted rectangle 700 as shown in FIG. 7 may be calculated from the rectangle 600. The rectangle 600 shows the cumulative loss for the various periods, while the rectangle 700 shows the incremental losses in each of the time periods. The manner of calculating the incremental values from the cumulative values was described above with reference to the calculation of the values in paid incremental actual triangle 400.

In step 340, unscaled Pearson residuals are calculated based on the following:

$$\text{Unscaled Pearson Residual} = \frac{\text{Actual} - \text{Fitted}}{\sqrt{|\text{Fitted}|}}$$

The actual values are the values from the paid incremental actual triangle 400 and the fitted values are the values from the upper left portion 707 of the paid incremental fitted rectangle 700. The results of the above calculation to determine the unscaled Pearson residuals are shown in the triangle 800 of FIG. 8. The unscaled Pearson residuals are zero for the oldest accident year 2006 and the most recent accident year 2010 at the most recent development periods, i.e., 60 months for accident year 2006 and 12 months for accident year 2010 as shown by cells 810 and 820, respectively. The residuals are always zero because the actual incremental loss always equals the fitted incremental loss for these time periods. The zero unscaled Pearson residuals are ignored for resampling, but not for calculating the degree of freedom adjustment factor as detailed below.

In step 345, the unscaled Pearson residuals are used to calculate scaled Pearson residuals by first determining the number of unscaled Pearson residuals (15 in this example) and calculating the degrees of freedom (6 in this example). A degree of freedom adjustment factor is calculated based on:

$$\text{DoF Adjustment Factor} = \sqrt{\frac{\text{\# of resid}}{\text{DoF}}}$$

Thus, in this example, the degree of freedom adjustment factor is 1.581. This value is then used to calculate the scaled Pearson residuals based on:

Scaled Pearson Residual=Unscaled Pearson Residual*DoF Adjustment Factor

Figure 9:
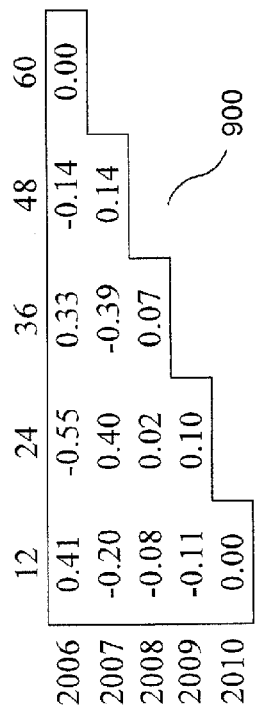
FIG. 9 shows an exemplary scaled Pearson residuals triangle for an insurance company.

Carrying through with the present example results in the scaled Pearson residuals as shown in the triangle 900 of FIG. 9.

In step 350, a scale parameter is calculated based on:

$$\text{Scale Parameter} = \Sigma \frac{\text{Unscaled Pearson Residual}^2}{\text{Degrees of Freedom}}$$

The exemplary data results in a scale parameter value of 0.0670.

In step 355, the calculation engine 120 builds residual plots based on the following:

$$\text{Plotted Residual} = \frac{\text{Scaled Pearson Residual}}{\sqrt{\text{Scale Parameter}}}$$

Figure 10:
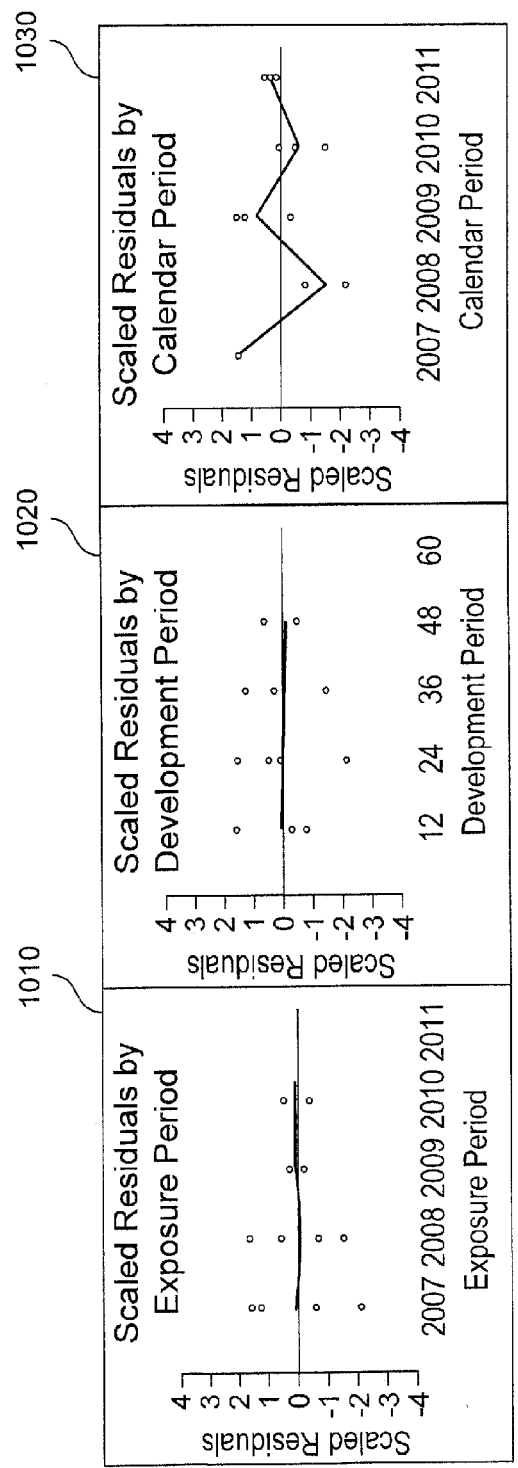
FIG. 10 shows an exemplary scaled residual plots for an insurance company.

Examples of residual plots are shown in FIG. 10. The three plots show the scaled residuals by exposure period 1010, by development period 1020 and by calendar period 1030. These residual plots 1010, 1020 and 1030 may be displayed to the user of the system 100 on the output device 130. The plots allow the user to see how well the model fits the data. The user can make adjustments to the model after reviewing these plots. It is noted that the chain ladder fitting is unaffected by the presence or absence of premium data.

Upon completion of step 355, the chain ladder fitting calculation 300 is complete. As should be apparent from the above-described calculations, the results of the chain ladder fitting calculation 300 are based on the underlying actual data for the insurance company that is included in the company database 110. Furthermore, the results of the chain ladder fitting calculation 300 may be used as described below in the chain ladder simulation calculation. The estimated future losses as a result of the chain ladder fitting calculation or the below GLM fitting calculation is a single reserve estimate using these methods. The simulation (chain ladder and GLM) that is described below gives an estimate of a range of reserves with their probabilities.

Figure 12:
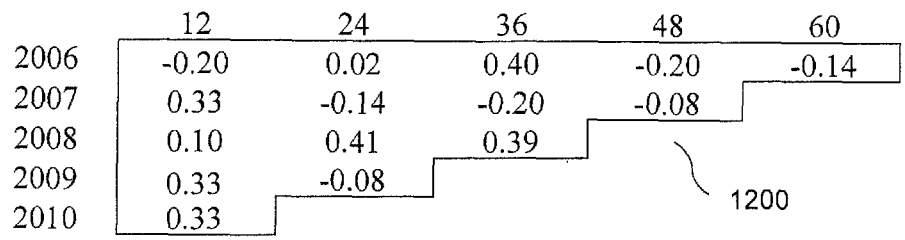
FIG. 12 shows an exemplary simulated scaled Pearson residuals triangle for an insurance company.

The chain ladder simulation calculations will be described with reference to the exemplary method 1100 illustrated by FIG. 11. In a first step 1105, values from the scaled Pearson residuals (e.g., triangle 900) generated by the chain ladder fitting calculation 300 are randomly resampled with replacement. FIG. 12 shows an exemplary triangle 1200 having randomly resampled scaled Pearson residuals based on the scaled Pearson residual triangle 900.

Figure 13:
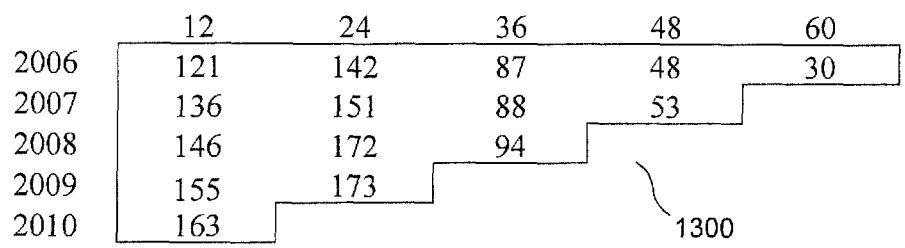
FIG. 13 shows an exemplary simulated incremental loss triangle for an insurance company.

In step 1110, these scaled Pearson residuals are used to simulate a new loss triangle based on:

Incremental Simulated Cell=Incremental Fitted Cell+
SPR√IncrementalFittedCell where SPR is the scaled Pearson residual. In this example, the incremental fitted cells are the cells in the upper left hand portion 707 of the rectangle 700 of FIG. 7. The result of this exemplary calculation is the triangle 1300 shown in FIG. 13.

In step 1115, the resampling process of step 1105 and the simulation of the incremental triangle of step 1110 are repeated based on a number of simulations selected by the user. As described above, the loss reserve calculations may be based on any number of simulations selected by the user. The user will normally select a number of simulations that results in a statistically significant number of simulations balanced against the amount of time it takes to run the simulations. Currently, it has been determined that 10,000-50,000 simulations may be run to provide statistically significant results. However, this should not be considered limiting, either a greater number or a lesser number of simulations may be run.

Thus, at the end of step 1115, there will be a number of simulated triangles corresponding to the number of simulations selected by the user of the system 100. For the remainder of the steps of the chain ladder simulation calculations 1100, the steps will be described with reference to a single simulation, but it should be understood that the steps are being performed for each of the number of simulations selected by the user. Another manner of stating this proposition is that the repeating step 1115 may be performed for the next simulation after step 1140 and the process may then loop back to step 1120 for each simulation until the user selected number of simulations have occurred.

Figure 14:
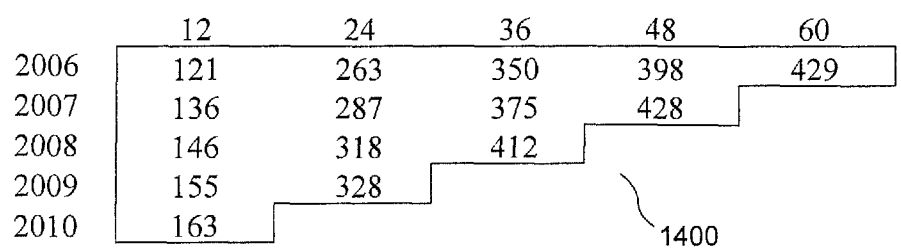
FIG. 14 shows an exemplary simulated cumulative loss triangle for an insurance company.

In step 1120, a simulated cumulative triangle is calculated based on each simulated incremental loss triangle. FIG. 14 shows a simulated cumulative triangle 1400 corresponding to the simulated incremental triangle 1300. In step 1125, simulated average ATA factors are calculated based on the simulated cumulative triangle 1400. The calculation of the average ATA factors was described above with reference to step 305 of method 300. The Average ATA factors based on the simulated cumulative triangle 1400 are:

| Simulated Average ATA: All Years | | | |
|---|---|---|---|
| 12-24 | 24-36 | 36-48 | 48-60 |
| 2.14 | 1.31 | 1.14 | 1.08 |

As described above, there may be an edge case where the paid cumulative actual triangle 200 is missing data in a cell and the calculation of the ATA factors may be handled differently as an edge case. In such a case, the simulated triangles should not have missing values as values in the cells corresponding to the missing cell in the original triangle may be re-sampled to create complete simulated triangles. However, when the simulated average ATA factors are calculated, the values in the simulated triangles corresponding to the missing values in the original triangles should be treated as missing and the simulated average ATA factors should be calculated in the same manner as the actual average ATA factors to reproduce the uncertainty from the unknown value.

Figure 15:
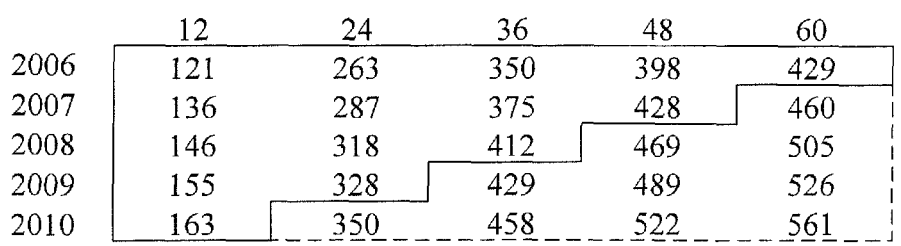
FIG. 15 shows an exemplary simulated cumulative loss rectangle for an insurance company.

In step 1130, the simulated average ATA factors and the simulated cumulative triangle 1400 are used to calculate a simulated cumulative loss rectangle 1500 as shown in FIG. 15. The simulated cumulative loss rectangle 1500 is calculated in the same manner as described above with reference to step 330 of method 300 and the corresponding rectangle 600.

In step 1135, the simulated cumulative loss rectangle 1500 is used to calculate a simulated incremental loss rectangle 1600 as shown in FIG. 16. The simulated incremental loss rectangle 1600 is calculated in the same manner as described above with reference to step 335 of method 300 and the corresponding rectangle 700.

In step 1140, a process variance calculation is applied based on a gamma distribution to each value in the bottom right portion 1604 of the simulated incremental loss rectangle 1600. A probability density function (PDF) of the gamma distribution is defined as:

$$f(x; \alpha, \beta) = x^{\alpha-1} e^{-\beta x} \frac{\beta^\alpha}{\Gamma(\alpha)} \quad \text{for } x \geq 0$$

$$\Gamma(\alpha) = (\alpha - 1)!$$

A cumulative distribution function (CDF) of the gamma distribution is defined as:

$$F(x; \alpha, \beta) = \int_0^x f(u; \alpha, \beta) du \text{ for } x \geq 0$$

Simulated value(before process var) = $\mu$ $$\alpha = \frac{|\mu|}{\text{scale parameter}}$$

$\beta$ = scale parameter $F(x; \alpha, \beta)$ = Selected percentile = random number (no correlation)

$$\text{Simulated value (after process variance)} = \begin{cases} x: & \mu > 0 \\ x - 2\mu: & \mu < 0 \\ 0: & \mu = 0 \end{cases}$$

This results in a gamma distribution. Application of an exemplary process variance calculation to the values in the lower right portion 1604 of the simulated incremental loss rectangle 1600 results in the simulated incremental loss rectangle including process variance 1700 as shown in FIG. 17.

In step 1145, the values from the simulated incremental loss rectangle including process variance 1700 are used to calculate various loss parameters. The exemplary loss parameters may include the ultimate loss, which is the cumulative loss for each accident period. For rectangle 1700 this is the summation of all values in the rectangle 1700, which equals 2,485 in this example. Another exemplary parameter is the unpaid loss, which is the cumulative loss for those periods covered by the rectangle for which actual data has not been collected, e.g., the lower right hand portion 1704 of the rectangle 1700, which equals 726 in this example. Other exemplary parameters include the ultimate loss and the unpaid loss for each accident year. For example, or the accident year 2006 of rectangle 1700, the ultimate loss would be the summation of the 5 values representing the 12, 24, 36, 48 and 60 month development losses or 121+142+87+48+30=428. Whereas, the unpaid loss would be the summation of the values for each individual accident year that are included in the lower right hand portion 1704 of the rectangle 1700. For the accident year 2006, there are no unpaid losses. As described above, in this example, it has been assumed that the losses will be fully developed by the fifth year of development. In contrast, the accident year 2008 includes two years of unpaid losses in the fourth and fifth year (48 and 60 months) of development or 60+38=98. The following shows the complete table of ultimate losses and unpaid losses by accident year:

| AY | Ult Loss | Unpaid Loss |
|---|---|---|
| 2006 | 428 | 0 |
| 2007 | 458 | 30 |
| 2008 | 510 | 98 |
| 2009 | 528 | 200 |
| 2010 | 561 | 398 |

It should also be noted that if the data provided to the system includes premium information, then the ultimate loss may be divided by the premium to produce loss ratios.

After the above described exemplary parameters are calculated for each simulated rectangle, this parameter data may then be used to calculate additional statistics that account for all the simulations. These additional statistics include, for example, the mean, the median, the standard deviation, the skew and percentiles. It should be noted that the user may select the various statistics that are calculated. For example, the user may desire to know the $40^{th}$, $50^{th}$ and $60^{th}$ percentiles and may enter this information into the system 100 for calculation and display. The above statistics may be shown based on calendar year and/or accident year. In addition, the mean and standard deviation of each incremental cell for each of the simulations may be calculated.

Those skilled in the art will understand that the parameters and statistics that are output by the chain ladder simulation calculation 1100 may be used by the user of the system 100 to help determine the appropriate loss reserves. For example, the user may consider that the loss reserves for the line of business for which the chain ladder simulation calculation 1100 has been performed should be the mean of the unpaid losses for the simulations. However, in other cases, the user may consider that the $80^{th}$ percentile value of unpaid losses should be the appropriate value for the loss reserves. That is, the system 100 provides the user with an abundance of statistics on which to base the decision as to the proper value for the loss reserves.

The chain ladder simulation may also take tail factors into account. The steps for taking tail factors into account are not shown in chain ladder simulation calculation 1100, but those skilled in the art will understand that the steps for the tail factors or any other additional feature described herein may be added as needed to the calculation 1100. Tail factors are needed when the future losses extend past the end of the triangle. The following provides an example of a three-year tail, but the calculations provided herein, may be for any n-year tail. The tail factors may be input by the user and in this example may be a 3-year tail factor having 10% in year 1, 5% in year 2 and 3% in year 3 with a 10% tail standard deviation. Thus, the tail mean for the 3 years is 1.1, 1.05 and 1.03. The mean values for the tail factors are treated as prospective ATA factors and are attached onto the end of a fitted triangle.

A tail factor simulation using the example started above is now provided. The tail means are multiplied to result in a total tail factor. In this example (1.1*1.05*1.03=1.19). Since the tail factors are treated as ATA factors for future periods, it is possible to use the value to calculate the ATU factors for each individual period in the tail. In this example:

|  | Year 1 | Year 2 | Year 3 |
|---|---|---|---|
| ATA (Mean) | 1.100 | 1.050 | 1.030 |
| ATU (Mean) | 1.190 | 1.082 | 1.030 |

A total tail factor may be simulated for multiple simulations. The simulation is based on a lognormal distribution with a mean equal to the total tail factor (calculated above as the product of the inputted tail factors) and a standard deviation equal to the value input by the user. This lognormal distribution may be calculated as follows:

$$f(x; \mu, \sigma) = \frac{1}{x\sigma\sqrt{2\pi}} e^{\frac{-(ln(x)-\mu)^2}{2\sigma^2}}, x > 0$$

$$\text{mean} = e^{\mu + \frac{\sigma^2}{2}} = \text{Total Tail Factor}$$

$$\text{variance} = \left(e^{\sigma^2} - 1\right)e^{2\mu + \sigma^2} = (\text{Tail } St \ Dev)^2$$

$$F(x; \mu, \sigma) = \Phi\left(\frac{\ln(x) - \mu}{\sigma}\right)$$

$$\Phi(x) = \text{Standard Normal } CDF \text{ of } x = \frac{1}{\sqrt{2\pi}} \int_{-\infty}^{x} e^{\frac{-t^2}{2}} dt$$

Using the simulated total tail factor, the three individual ATA factors that multiply to form the total tail factor can be calculated, assuming that the allocation is proportional to the original mean parameters. Using the exemplary factors calculated above, the total simulated tail data would be:

|                      | Year 1 | Year 2 | Year 3 |
|----------------------|--------|--------|--------|
| Incremental Paid (Sim) | 10%    | 5%     | 3%     |
| % Paid (Sim)         | 82%    | 91%    | 97%    |

This data may then be used to calculate the ATA and ATU factors as described above. To complete the example started above, the results are:

|                   | Year 1 | Year 2 | Year 3 |
|-------------------|--------|--------|--------|
| ATU Factors (Sim) | 1.22   | 1.09   | 1.03   |
| ATA Factors (Sim) | 1.12   | 1.06   | 1.03   |

The simulation described above, e.g., starting with the simulation using the lognormal distribution, may be performed multiple times to result in a number of factors that may be used in the loss reserve calculations.

The calculation engine 120 in performing the chain ladder simulation calculations 1100 may also take systemic risk into account. This systemic risk feature allows a user to widen the unpaid loss distribution. This is a desirable feature because in many cases the calculation described above indicates a reserve distribution that is too narrow when compared with historic reserve variability. The systemic risk distribution accomplishes this by overlaying a random sample from a gamma distribution with mean of one and standard deviation parameterized by the user. For each simulation, one random sample from a gamma distribution is taken, and each unpaid value in the simulated rectangle is multiplied by that sample. Since the distribution has a mean of one, over many simulations this will not affect the mean value of the distribution. It will affect the coefficient of variation (CV), standard deviation, skew and percentiles of the distribution. Because another dimension of variability is added, the CV and standard deviation of the model will increase. Because the gamma distribution that is sampled is positively skewed, adding systemic risk will increase the skew of the simulated output. Also, the percentiles will move further apart. This has the effect of increasing the risk (and accordingly, required capital) indication of the model without changing the mean reserve best estimate.

FIG. 18 shows a first simulated rectangle 1800 that does not include systemic risk, a second rectangle 1810 that includes systemic risk and a third rectangle 1820 that includes systemic risk and process variance. The first rectangle 1800 is the rectangle produced by the simulation described above without any systemic risk or process variance applied. The user selects a systematic risk standard deviation parameter and a random sample from the gamma distribution of this systematic risk parameter. This value is multiplied by all the calculated values in the rectangle 1800 (i.e., the lower right hand portion 1804 values) to produce the rectangle 1810. As described above, the simulations using the systematic risk calculations, widens the unpaid loss distribution to favorably compare with historic reserve variability. The same principle may be applied to a rectangle that includes process variance to result in the rectangle 1820 that includes both process variance and systemic risk.

Another feature of the chain ladder simulation is a one-year risk simulation that indicates the simulated changes to the mean reserve estimate at one-year intervals. For example, for period 0-1, the one-year risk simulation is the distribution of potential reserve changes from year 0 (current estimate) to year 1 (1 year from now). Generally, this may be expressed as period (n−1)−n where the results indicate the CDF of reserve changes from year n−1 to year n. The one-year risk calculation accounts for losses paid in the calendar year.

The following provides an exemplary calculation using the one-year risk simulation. The example uses the values of the paid incremental actual triangle 400 presented in FIG. 4 and the ATA and ATU values described in the example with respect to FIG. 4. The example also uses the values associated with the three-year tail example described above having tail mean values of 1.1, 1.05 and 1.03. This results in the paid incremental fitted rectangle 1900 of FIG. 19. The calculations for determining the paid incremental fitted rectangle 1900 were described above and will not be repeated here.

The reserve estimate at time 0 ($R_0^{BE}$) is calculated based on the actual loss triangle and tail factors. In this example, the value of $R_0^{BE}$=1194. Additional rectangles and n-year tails are then simulated using the methodologies described above. As with the other simulations described above, the number of simulations may be based on user input. FIG. 20 provides an example of a simulated rectangle 2000 with a simulated tail. The top left portion 2007 of the simulated rectangle 2000 is replaced with the corresponding top left portion 707 of the paid incremental fitted triangle 700 resulting in rectangle 2100 of FIG. 21.

The simulated final unpaid loss is then calculated. In this example, this ultimate loss will not be known until year n=7, when the last tail for the most recent accident year (2010) is paid and there are no more reserves, i.e., $R_{n=ult}^{BE}$=0. The actual unpaid loss may be calculated from the following:

$$ActualUnpaidLoss = R_{ult}^{BE} + \sum_{n=1}^{ult} Pd_{n-1} = 1250$$

In this simulation, the change in reserve estimate from the first evaluation at n=0 to the time the final claim is paid is (n=7 for this rectangle) is:

$$R_{ult}^{BE} - R_0^{BE} = 1250 - 1194 = 56$$

Figure 22:
FIG. 22 shows the rectangle of FIG. 21 with values removed to determine a particular one-year risk simulation.
Figure 23:
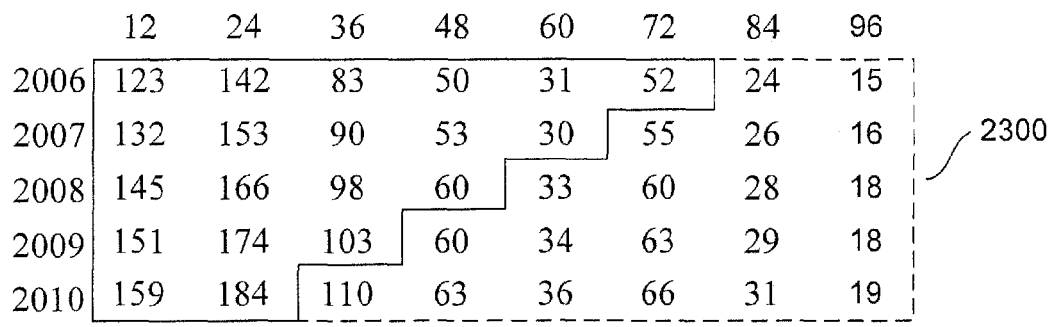
FIG. 23 shows an exemplary simulated incremental fitted rectangle with a tail applied for an insurance company.

The one year risk simulation may then be moved to the next year, e.g., n=1, where the next simulated diagonal is filled into the triangle and all other simulated data is removed. FIG. 22 shows an exemplary triangle 2200 where the next simulated diagonal 2210 has been filled in and the remaining simulated data has been removed from portion 2220. The data that is now in the triangle 2200 is all the payment information that will be available at time n=1. The data in triangle 2200 may then be converted into a cumulative triangle (not shown) and using the chain ladder calculation described extensively above average ATA factors may be calculated. The average ATA factors may then be used to calculate a cumulative rectangle (not shown) in the same manner described extensively above using the cumulative triangle and the average ATA factors. The cumulative rectangle is used to calculate an incremental rectangle such as the rectangle 2300 shown in FIG. 23.

The values in the rectangle 2300 may be used to calculate the reserve best estimate at time n=1. Using the values from the rectangle 2300, the reserve best estimate at time n=1 ($R_1^{BE}$=817) and the losses paid in year n=0 is $Pd_0$=429. As calculated above, the $R_0^{BE}$=1194. Thus, $$R_1^{BE} + Pd_0 - R_0^{BE} = 52$$

For this simulation, the year 0-1 change in reserve is +52. However, it is noted that many simulations are run and there will be positive and negative changes for the various simulations where the average change between any two years will be approximately 0.

The process may then be continued for the next one year evaluation, e.g., from time n=1 to n=2. The process for determining the parameters associated with n=2, e.g., $R_2^{BE}$=543 and $Pd_1$=286, is the same as described above for the corresponding values of n=1. The process is then continued until the triangle is fully paid out, e.g., n=7 in this example. An example of the complete data of one year reserve changes for a simulation may be as follows:

| Year  | 1 Year Change | Reserve at Beginning | Paid | Reserve at End |
|-------|---------------|---------------------|------|----------------|
| 0-1   | 52            | 1194                | 429  | 817            |
| 1-2   | 12            | 817                 | 286  | 543            |
| 2-3   | −7            | 543                 | 207  | 330            |
| 3-4   | 0             | 330                 | 148  | 182            |
| 4-5   | −1            | 182                 | 114  | 67             |
| 5-6   | −1            | 67                  | 49   | 17             |
| 6-7   | 0             | 17                  | 17   | 0              |
| 0-ult | 56            |                     | 1250 |                |

The one-year change calculations may be carried out for each of the simulations. This data may be organized as desired by the user, e.g., by ranking the one-year changes and determining key percentiles. In addition, the calculation engine 120 may calculate the correlation between the sequential one-year reserve risk distributions. This correlation may be used to answer a question such as if one year develops adversely, how likely is it that the next year will also develop adversely. The system 100 will output the one-year risk distribution correlations in the form of a correlation matrix relating all years being modeled. This is calculated using linear correlation between the one-year changes in reserve in each simulation. The following shows an example matrix using ten sample simulations and two prospective periods:

| Sim | CY 0-1 | CY 1-2 |
|-----|--------|--------|
| 1   | 97     | 4      |
| 2   | −232   | 21     |
| 3   | −36    | −17    |
| 4   | 203    | 79     |
| 5   | 277    | 43     |
| 6   | −71    | 47     |
| 7   | −36    | 76     |
| 8   | −232   | −53    |
| 9   | −3     | −77    |
| 10  | −79    | 25     |

The system may then calculate the linear correlation between CY 0-1 and CY 1-2 for each of the simulations using the following:

$$\rho_{CY0-1,CY1-2} = \frac{E[(CY_{0-1} - \mu_{0-1})(CY_{1-2} - \mu_{1-2})]}{\sigma_{0-1}\sigma_{1-2}}$$

$\rho_{CYn-(n+1),CYm-(m+1)}$ = linear correlation between $CY_{n-(n+1)}$ and $CY_{m-(m+1)}$ $\mu_{n-(n+1)}$ = average of $CY_{n-(n+1)}$ $\sigma_{n-(n+1)}$ = standard deviation of $CY_{n-(n+1)}$ Using the example data from above, the linear correlation would be calculated to be 0.390.

It is noted that the one-year risk calculation described above is described with reference to the chain ladder calculation. However, this same calculation may be applied to the GLM calculation and the incurred chain ladder calculation described below. This one-year risk calculation will not be described again below in connection with these exemplary calculations, but those skilled in the art will understand that the above exemplary one-year risk calculation may be equally performed based on the data from these calculations.

This completes the description of the exemplary chain ladder model calculations. As described above, the chain ladder model calculations provide results for expected reserve losses for the insurance company based on the company's experience as embodied in the data stored in the company database 110. The company may elect to use these results to select a loss reserve value.

Figure 24:
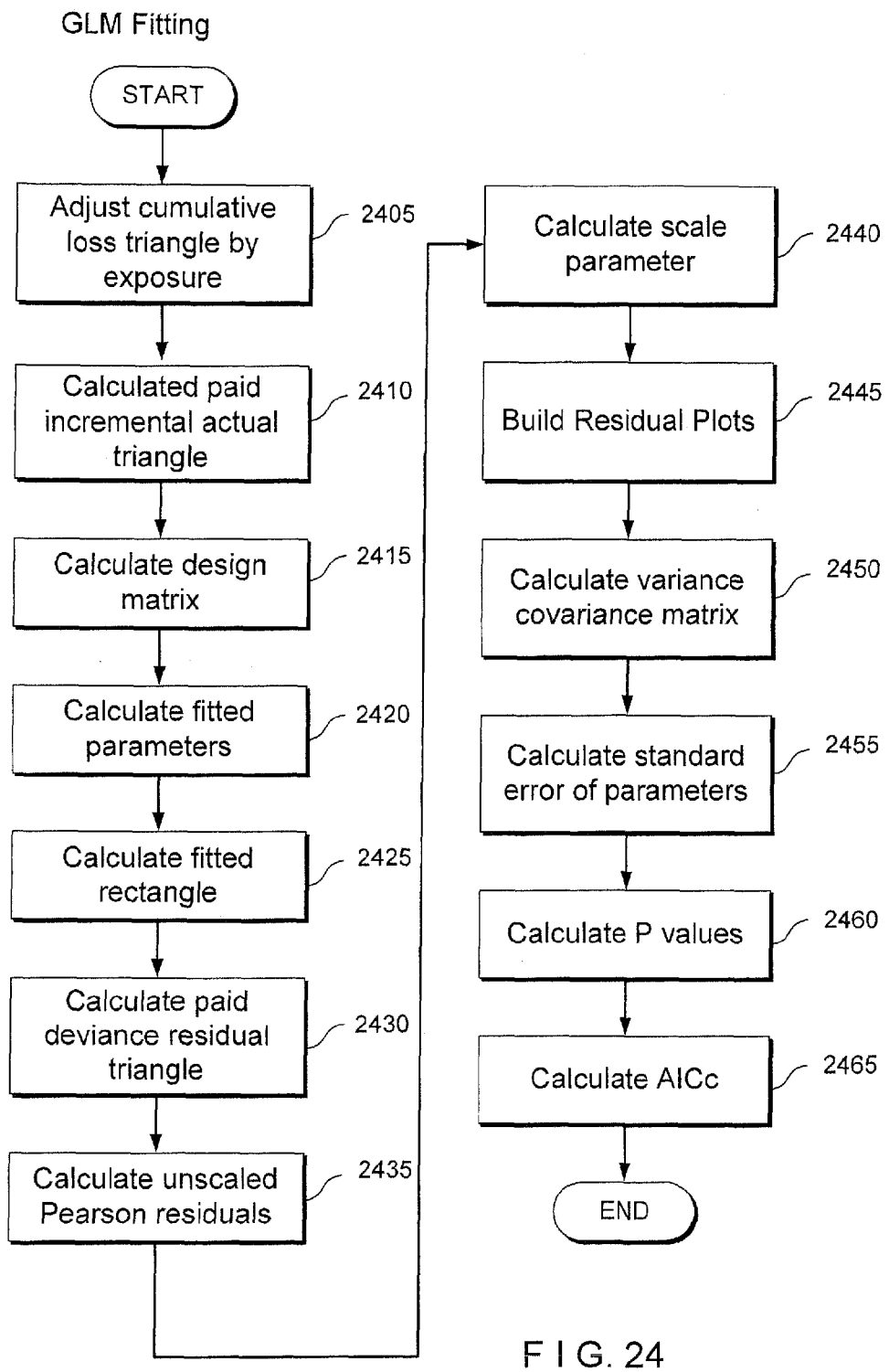
FIG. 24 shows an exemplary generalized linear model (GLM) fitting calculation.

As described above, a second exemplary manner of performing a loss reserve calculation is a GLM calculation. Similar to the chain ladder model calculations, the GLM calculations include a fitting portion and a simulation portion. Initially, the GLM fitting calculations will be described with reference to the exemplary method 2400 illustrated by FIG. 24. The input into the GLM fitting calculation is the same cumulative paid loss triangle as the chain ladder calculation, e.g., triangle 200 of FIG. 2. However, unlike the chain ladder fitting calculation, the GLM fitting calculation needs additional inputs beyond the paid loss triangle 200. This additional input is user assigned breaks for the exposure level (AY), the development decay (DY) and the calendar trend (CY). The following provides exemplary input by a user to assign breaks for the present example:

| AY | 1 | 0 | 0 | 0 | 0 |
|----|---|---|---|---|---|
| DY | 0 | 1 | 1 | 0 | 0 |
| CY | 0 | 1 | 0 | 0 | 0 |

User assigned breaks are where the user indicates the model is to calculate a new parameter. This allows the model to be customizable for each dataset.

In addition, other inputs such as an input exposure adjustment may be provided. The input exposure adjustments may be, for example, claim counts, on-level premiums, number of insured homes or cars, etc. The following shows an example of input exposures:

| AY | Exposures |
|------|-----------|
| 2006 | 612 |
| 2007 | 599 |
| 2008 | 619 |
| 2009 | 606 |
| 2010 | 615 |

If the loss data is exposure adjusted, each of the cells in the triangle (e.g., triangle 200) is divided by the appropriate exposure adjustment before the triangle is fit. For example, the cumulative paid loss triangle 200 may be adjusted by the above exposure data to result in the exposure adjusted cumulative loss triangle 2500 of FIG. 25. This adjustment is shown as step 2405 in method 2400. It is noted that the input of exposure adjustments, and therefore, step 2405, is optional. If the loss data is not exposure adjusted, the exposure levels are treated as having a value of 1 and the values in the cells of the cumulative paid loss triangle 200 remain the same and all the calculations described below are performed on the non-exposure adjusted loss values. However, for the purposes of this exemplary calculation, it will be considered that a user of the system 100 has entered the above example exposure adjustments.

In step 2410, a paid incremental actual triangle 2600 as shown in FIG. 26 is calculated based on the cumulative paid loss triangle 2500. The calculations for determining the paid incremental actual triangle 2600 have been described in detail above with reference to step 320 of method 300 and the corresponding triangle 400. The GLM calculations can also handle the edge case of columns of 0 incremental losses at the beginning and end of the input loss triangle by only fitting to the portion of the triangle that does not have columns of 0 incremental losses. These columns of zeros are added back after the fit.

In step 2415, a design matrix is specified by the actuary based on the dimensions of the triangle (e.g., triangle 2600) and their selection of breaks that prescribe the placement of new parameters that best fit the dataset. The design matrix arranges the combination of parameters needed to calculate each cell. The matrix is used to allocate factors to each cell in the triangle based on their position. For each cell in the incremental triangle 2600, there is a corresponding row in the design matrix. For each row, the following calculation is performed:

$$\text{Fitted Cell} = \Sigma_i^i \text{ design matrix} * \text{fitted parameters}_i^j$$

Figure 27:
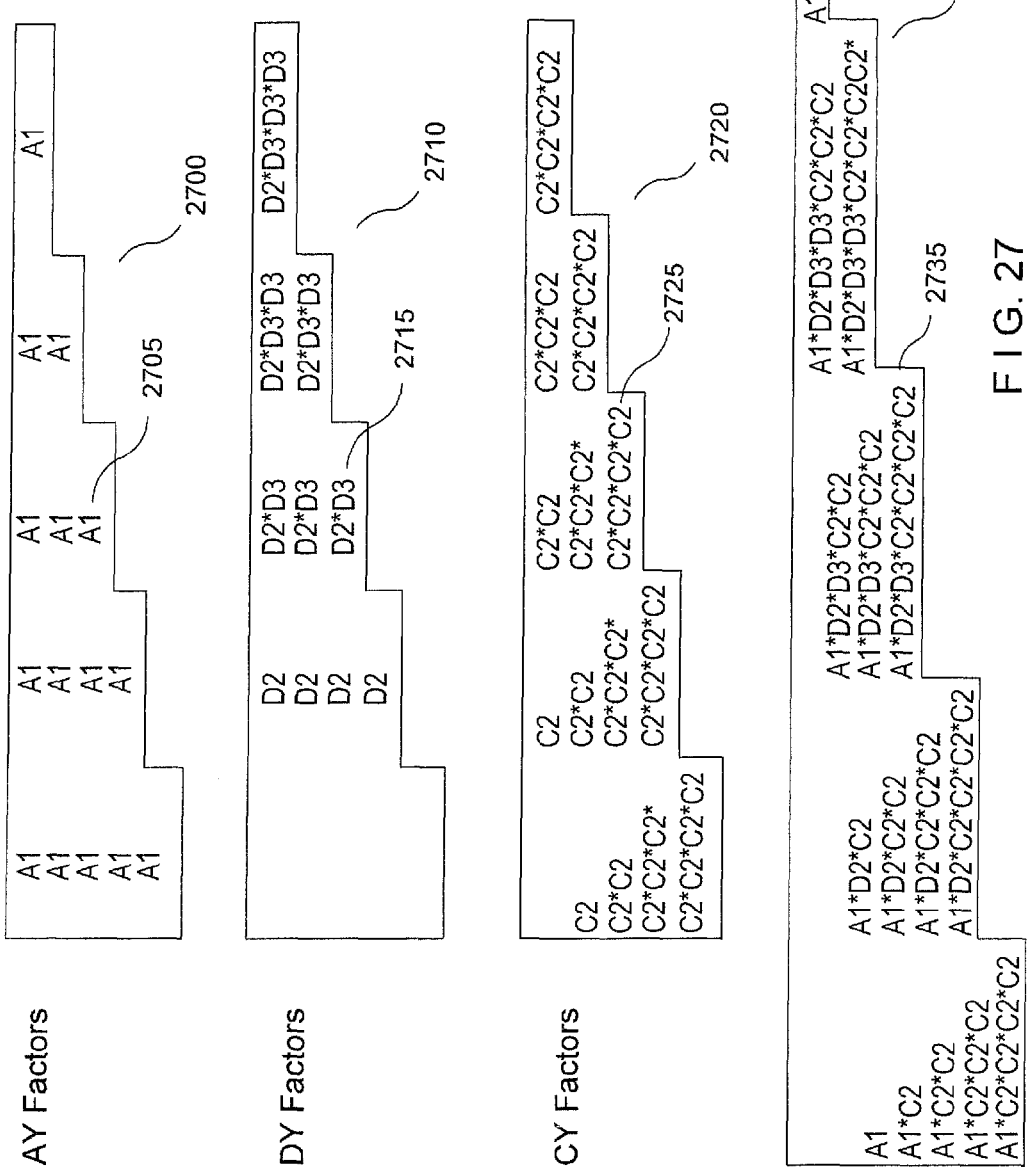
FIG. 27 shows an exemplary exposure factor triangle, development factor triangle, calendar factor triangle and fitted triangle that is a combination of the three factor triangles.

FIG. 27 shows an exemplary calculation of factor triangles 2700, 2710 and 2720 that are used to create the fitted triangle 2730. The fitted triangle 2730 corresponds to the design matrix as will be described in greater detail below. However, first the creation of the fitted triangle 2730 will be described. As shown in the above exemplary input, there is only one AY break that has been entered by the user in this example. Thus, the entire triangle is at the same exposure level A1 as shown in the AY factor triangle 2700. There are development decay breaks in the second and third development periods, therefore, there is one decay factor D2 applied in the second year and another decay factor D3 that is applied in the third, fourth and fifth year as shown in the DY factor triangle 2710. Finally, there is one calendar period factor C2 in the exemplary data that is applied to each calendar period as shown in CY factor triangle 2720. Each cell of the fitted triangle 2730 is calculated by multiplying the values of the corresponding cells in all three factor triangles 2700, 2710, and 2720. For example, in the third row, third column of the fitted triangle 2730, the cell 2735 is populated based on A1*D2*D3*C2*C2*C2*C2 which can be seen is the multiplication of the cells 2705, 2715 and 2725 of the third row, third column of each of the factor triangles 2700, 2710 and 2720. Those skilled in the art will understand that the factor triangles 2700, 2710 and 2720 are created based on the breaks selected by the user. Thus, if the user selects different breaks, the factor triangles will appear different than the examples, but will be created using the same process as described above.

The design matrix is populated in the exact same manner. For example, the corresponding design matrix 2800 for the fitted triangle 2730 is shown in FIG. 28. To carry through with the example started above, the third row, third column cell 2735 of the fitted triangle 2730 corresponds to the cell 12 (2805) of the design matrix 2800. As shown in this entry of the design matrix there is 1 A1 factor, 1 D2 factor, 1 D3 factor and 4 C2 factors, the same as described above for cell 2735.

In the next step 2420, optimal fitted parameters are calculated for the given data set and the user input breaks. This may be based on the following:

$$\Psi = \sum_{i=1}^{\text{all cells}} \frac{1}{\text{exposure}}$$

$$\text{weight}_i * [\text{Actual}_i * \ln(\text{fitted}_i) - \text{fitted}_i - \text{gammaln}(\text{actual}_i + 1)_i^2]$$

$\Psi$ = Model Goodness of Fit Term $i$ = Cell number (from matrix)

To find the best fit for the incremental triangle 2600, the combination of parameters that maximizes the Model-Goodness-of-Fit-Term is found. In this example, the triangle 2600 has been exposure adjusted. Thus, each value in the sum is weighted by its respective exposure level (i.e. more exposure means more weight in the fitting). The set of parameters that maximize the sum are the fitted parameters. Applying the above-described calculations to the data in this example, the result is:

|        | A1     | D2    | D3     | C2    |
|--------|--------|-------|--------|-------|
| x      | −1.593 | 0.081 | −0.589 | 0.065 |
| Exp(x) | 0.20   | 1.08  | 0.55   | 1.07  |

In the step 2425, the fitted parameters are used to calculate factor rectangles 2900, 2910 and 2920 as shown in FIG. 29. The AY factor rectangle 2200 is calculated by applying the same values (A1) to the lower right portion 2904 as to the top left portion 2907. Similarly, the DY factor rectangle 2910 is created in the same manner by applying the same values (D2, D3 or products thereof) to the lower right portion 2914 as to the top left portion 2917. However, for the CY factor rectangle 2920, the bottom right portion 2924 depends on an entry of a Prospective Calendar Trend by the user. If the user has not entered a value, the calculation engine 120 defaults to the most recent fitted parameter with no variance. An example of a Prospective Calendar Trend that has been entered by the user may be:

| Prosp Calendar Trends Mean   | 1.07 | 1.07 | 1.07 | 1.07 | 1.07 |
|------------------------------|------|------|------|------|------|
| Prosp Calendar Trends St Dev | 2.0% | 3.0% | 4.0% | 5.0% | 6.0% |

This Prospective Calendar Trend may then be used to fill in the bottom right portion 2924 of the CY factor rectangle 2920. An incremental fitted rectangle 3000 as shown in FIG. 30 is calculated by multiplying all the values from the corresponding cells of the factor rectangles 2900, 2910 and 2920.

The user may model the prospective development year trend parameters in the same way that development trends are modeled within the body of the loss triangle. For example, if there is only one prospective development trend at the end of the triangle that continues for 5 years, then only one value is simulated and used for all 5 years. In another example, all 5 development trends, which were all independent of each other, can be used.

The GLM allows a user to apply an auto-regressive model with parameters that can be inputted by the user to model the prospective calendar year trend. This allows for greater correlation (and therefore more realistic variability) in prospective calendar trend modeling. The method is one of the standard ways to model inflation in econometric modeling. In addition, the GLM may suggest parameters for the user to input into the auto-regressive model, by fitting an auto-regressive model to the historical calendar-year trend.

In a next step 2430, a paid deviance residual triangle is calculated based on the incremental actual triangle 2600 and the corresponding values of the upper left portion 3007 of the incremental fitted rectangle 3000. The deviance residual calculation is:

$$\text{Deviance Residual} = \text{sign}(\text{actual} - \text{fitted}) * \sqrt{2\left(\text{actual} * \ln\left(\frac{\text{actual}}{\text{fitted}}\right) - \text{actual} + \text{fitted}\right)}$$

If the value of the incremental actual cell is 0, the formula for the deviance residuals becomes:

$$\text{Deviance Residual} = \text{sign}(\text{actual} - \text{fitted}) * \sqrt{2(-\text{actual} + \text{fitted})}$$

FIG. 31 shows an example of a deviance residual triangle 3100 using the exemplary values provided above.

In the next step 2435, the unscaled Pearson residuals are calculated by first counting the number of residuals in the deviance residual triangle 3100 that are neither blank nor zero and determining the degrees of freedom. In this example, the number of residuals is 15 and there are 11 degrees of freedom. This information may then be used to calculate the unscaled Pearson residuals. However, before this calculation is performed, the values in the incremental actual triangle 2600 and fitted incremental rectangle 3000 must be multiplied by the exposure values if the exposure values were used, as they were in the present example. After this is accomplished, the unscaled Pearson residuals may be calculated based on:

$$\text{Unscaled Pearson Residuals} = \frac{\text{Actual} - \text{Fitted}}{\sqrt{|\text{Fitted}|}}$$

FIG. 32 shows the incremental actual triangle 3200 and fitted incremental triangle 3210 after they have been multiplied by the exposure values. FIG. 32 also shows the unscaled Pearson residuals triangle 3220 that was calculated based on the triangles 3200 and 3210 using the above formula.

In step 2440, a scale parameter is calculated in the same manner that was performed in the chain ladder fitting and described with reference to step 350 of method 300:

$$\text{Scale Parameter} = \frac{\sum \text{Unscaled Pearson Residual}^2}{\text{Degrees of Freedom}}$$

In the present example, the result of this calculation is 0.0672.

Figure 33:
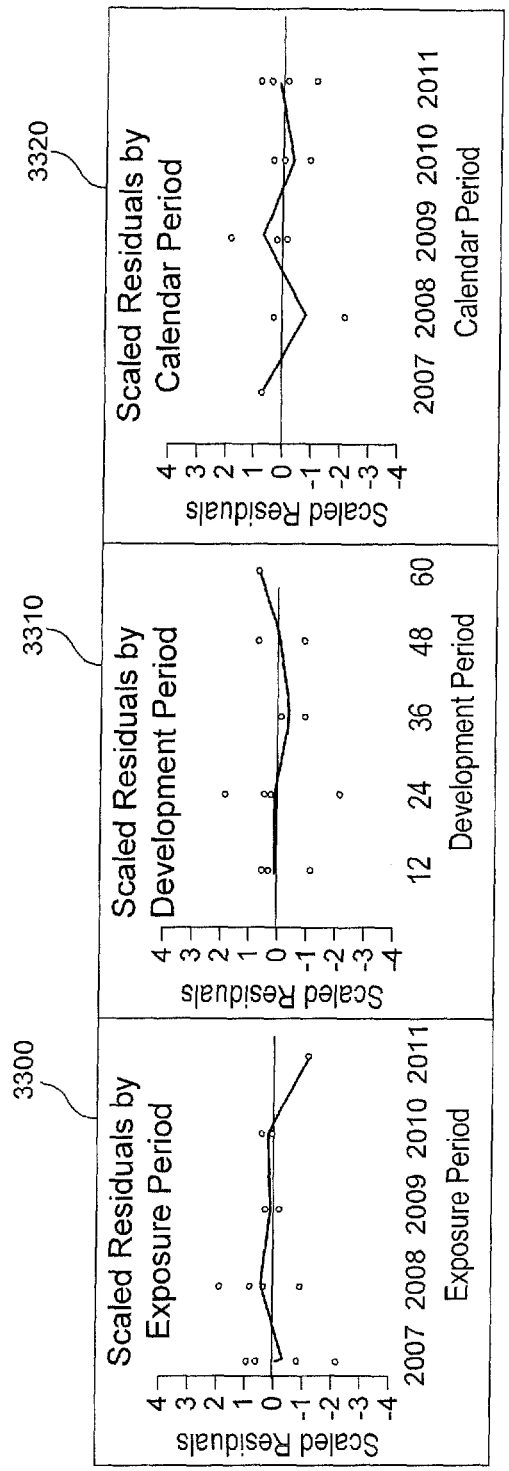
FIG. 33 shows an exemplary scaled residual plots for a modeled triangle.

In step 2445, the scale parameter is used to construct the residual plots such as the exemplary plots 3300, 3310 and 3320 as illustrated in FIG. 33. The plot 3300 is the scaled deviance residuals by exposure period, the plot 3310 is the scaled deviance residuals by development period, and the plot 3320 is the scaled deviance residuals by calendar period. The plots may be constructed based on:

$$\text{Plotted Residual(exposure adjusted triangle)} = DR * \sqrt{\frac{\text{Exposure}}{\text{Scale Parameter}}}$$

or $$\text{Plotted Residual(non exposure adjusted triangle)} = \frac{DR}{\sqrt{\text{Scale Parameter}}}$$

depending on whether the user has entered exposures. As with the plots built with reference to the chain ladder fitting calculation, the plots may be output via the output device 130 and used for the same purposes by a user of the system 100.

In step 2450, a variance covariance matrix is generated. In this example, a log link function (parameters are multiplicative) and an over-dispersed Poisson error term (error is proportional to the mean fitted incremental loss) are used. However, other manners of generating a variance covariance matrix may also be used. It is also noted that the log link and the Poisson error term are features of the GLM calculation, not just of the Variance Covariance matrix. That is, the exemplary embodiments allow the use of multiple distributions in addition to an over-dispersed Poisson distribution, e.g., normal distribution (error is independent of fitted mean incremental loss), gamma distribution (error is proportional to the mean incremental loss squared), inverse Gaussian distribution, etc. The different error terms will result in different fits and therefore different parameters. Those skilled in the art of GLM analysis will understand how to fit and simulate data with these different error terms. The purpose of using these terms is to better fit data with different underlying volatilities. For example, the normal error term tends give a better fit to data that has more variability in the values near the tail of the triangle. The gamma error term tends to provide a better fit to data that has more variability in the earlier development periods (where incremental losses are higher).

The following provides the exemplary manner of generating the variance covariance matrix and an exemplary result:

$VarCovar$ Matrix $= (X'WX)^{-1}\phi$ $X$ = Design Matrix $X'$ = Design Matrix Transpose $W$ = Diagonal matrix of weights $(\omega_i)$ $\phi$ = Scale Parameter -continued $$\omega_i = \frac{p_i}{\left[b''(\theta_i)\left(\frac{d\eta_i}{d\mu_i}\right)^2\right]}$$

$p_i$ = apriori weights (from exposure weighting)

$$b''(\theta_i) = \frac{\sigma_i^2 p_1}{\phi}$$

$\sigma_i^2$ = variance of model estimate $Y_i$ $\frac{\eta_i}{\mu_i} = \ln(\mu_i)$ : (log link function)

$\left(\frac{d\eta_i}{d\mu_i}\right) = \frac{1}{\mu_i}$

The exemplary result of the above may be as follows:

|    | A1      | D2      | D3      | C2      |
|----|---------|---------|---------|---------|
| A1 | 0.0002  | -0.0001 | 0.0000  | -0.0001 |
| D2 | -0.0001 | 0.0002  | -0.0001 | 0.0000  |
| D3 | 0.0000  | -0.0001 | 0.0001  | 0.0000  |
| C2 | -0.0001 | 0.0000  | 0.0000  | 0.0000  |

It should be noted that the GLM will recognize if it is fitting to all 0 incremental losses in an area of the triangle and adjust the variance covariance matrix to account for this by setting the variance and covariance to 0 for the development parameter fitted to the all 0 data. In the standard GLM framework the mean value would be approximately 0, but this would cause the variance and covariances to approach infinity. To handle this edge case, the model is alerted to this and the variance values are set to 0.

In step 2455, the standard errors of the parameters may be calculated based on:

Standard Error=$\sqrt{\text{variance}}$

Again, using the variances from the exemplary variance covariance matrix provided above, the resulting standard error is:

|                | A1     | D2     | D3     | C2     |
|----------------|--------|--------|--------|--------|
| Standard Error | 0.0149 | 0.0140 | 0.0105 | 0.0053 |

It is noted that the variance covariance matrix is in logspace based on the above calculations, meaning that the standard error is also in logspace. Therefore, an additional calculation needs to be performed to move the standard error into dollar space. Based on the fact that the parameters are normally distributed in logspace and lognormally distributed in dollar space, the following calculation may be performed:

μ=fitted parameter in logspace
σ=standard error of parameter in logspace
variance of lognormal distribution=$(e^{\sigma^2}-1)e^{2\mu+\sigma^2}$
standard error of parameter in $ space=$\sqrt{(e^{\sigma^2}-1)e^{2\mu+\sigma^2}}$ This results in the following standard error in dollar space:

|                   | A1     | D2     | D3     | C2     |
|-------------------|--------|--------|--------|--------|
| Standard Error ($) | 0.0030 | 0.0152 | 0.0058 | 0.0056 |

In step 2460, P values are calculated based on a two tailed student's T-Distribution as follows:

Probability Density Function $$f(t) = \frac{\Gamma\left(\frac{v+1}{2}\right)}{\sqrt{v\pi}\,\Gamma\left(\frac{v}{2}\right)}\left(1+\frac{t^2}{v}\right)^{-\frac{v+1}{2}}$$

$v = DoF$ $\Gamma(\alpha) = \int_0^\infty x^{\alpha-1}e^{-x}dx : (\alpha > 0)$ $\Gamma(\alpha) = (\alpha-1)!$ : (where $\alpha$ is a positive integral)

$t = |T - \text{Statistic}|$ $T \text{ Statistic} = \frac{\Delta \text{Parameter}}{\text{Standard Error}}$ $\Delta$ Parameter = Parameter – Previous Parameter (Previous Parameter = 0 for the first parameter in a given direction)

Cumulative Distribution Function $F(t)=\int_{-\infty}^{t} f(u)du$ $P$ value=$1-2F(t)$ P value
$H_0$: $\Delta$Parameter=0
$H_1$: actual mean of fitted parameter≠1

The p value is the probability of accepting the null hypothesis. In the present example, the results of this calculation are:

|         | A1     | D2     | D3     | C2     |
|---------|--------|--------|--------|--------|
| p-value | 0.0000 | 0.0001 | 0.0000 | 0.0000 |

Finally, in step 2465, an Akaike Information Criterion (AICc) that measures the overall goodness of the fit of the chosen model is calculated as follows:

$$AICc = 2*(\text{Negative LogLiklihood}) + 2(k+1) + \frac{\{2(k+1)(k+2)\}}{n-k-2}$$

Negative LogLiklihood = $\sum_i X_i * \ln(Y_i) - \ln(\Gamma(X_i + 1))$ $k$ = number of breaks $n$ = number of data points used to fit $\Gamma(n) = (n-1)!$ Where $n$ is a positive interger $\Gamma(z) = \int_0^\infty t^{z-1}e^{-t}dt$ Upon completion of step 2465, the GLM fitting calculation 2400 is complete. As should be apparent from the above-described calculations, the results of the GLM fitting calculation 2400 are based on the underlying actual data for the insurance company that is included in the company database 110. Furthermore, the results of the GLM fitting calculation 2400 may be used as described below in the GLM simulation calculation.

Figure 34:
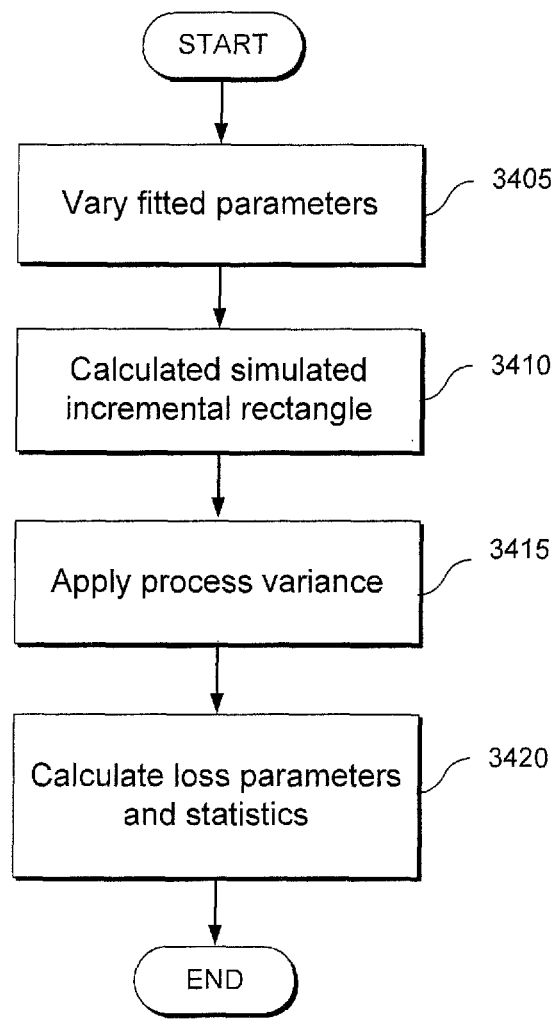
FIG. 34 shows an exemplary GLM simulation calculation.

The GLM simulation calculations will be described with reference to the exemplary method 3400 illustrated by FIG. 34. In step 3405, the fitted parameters that are found using the GLM fitting calculations 2400 described above are varied using a multivariate normal distribution. The following are a set of example simulated parameters:

|       | A1      | D2    | D3      | C2    |
|-------|---------|-------|---------|-------|
| x     | (1.596) | 0.092 | (0.589) | 0.065 |
| exp(x)| 0.20    | 1.10  | 0.55    | 1.07  |

Individually, the simulations for each parameter will be normally distributed and each parameter will have a covar relationship with the other parameters dictated by the variance covariance matrix. The normal distribution of the simulated parameters may be defined as follows:

$$f(x) = \frac{1}{\sqrt{2\pi\sigma^2}} e^{-\frac{(x-\mu)^2}{2\sigma^2}}$$

$\mu$ = fitted parameter $\sigma$ = Standard Error

In step 3410, a simulated incremental rectangle is calculated. First, simulated design AY, DY and CY factor rectangles may be calculated using the simulated parameters. The calculation of these rectangles may be performed in the same manner as described above for the GLM fitting method 2400. These calculations are described with reference to steps 2415, 2420 and 2425 and FIGS. 27 and 29. FIG. 35 shows an AY rectangle 3500, a DY rectangle 3510 and a CY rectangle 3520 generated from the simulated parameters provided above. As described above in the GLM fitting calculation method 2400, to generate the CY rectangle 3520, the system also needs Prospective Calendar Trend parameters. As also described above, each period of the Prospective Calendar Trend parameters are varied by a lognormal distribution with a mean and standard deviation that is input by the user. The Prospective Calendar Trend parameters are independent from one another and uncorrelated with the other simulated parameters. The AY rectangle 3500, DY rectangle 3510 and CY rectangle 3520 are combined and multiplied by the exposure levels described above as input by the user to create the simulated incremental rectangle 3530.

In a next step 3415, a process variance calculation is applied to the values in the bottom right portion 3534 of the simulated rectangle 3530. This process variance calculation is exactly the same as was described above with reference to step 1140 of the chain ladder simulation calculations 1100, i.e., the application of a probability density function and cumulative distribution function with respect to a gamma distribution. Since this has been described in detail above, it will not be described again. The exemplary result of applying the process variance calculation is shown as simulated rectangle with process variance 3600 in FIG. 36.

In the next step 3420, the calculation engine 120 will calculate various loss parameters and statistics based on the data in the rectangle 3600. Again, the loss parameters and statistics may be the same as those described above with reference to step 1145 of the chain ladder simulation 1100 and will not be described again. The exemplary loss parameters and statistics include, for example, the unpaid estimate by accident year, unpaid loss estimate by accident year, etc. The statistics may also be shown based on calendar year. As was described in detail above with reference to the chain ladder simulation calculations 1100, the GLM simulation calculations 3400 have been described with reference to a single simulation. However, the simulation will be carried out multiple times based on a number of simulations selected by the user of the system 100. That is, for the number of simulations selected, the calculation engine 120 will perform the steps of the method 3400 individually for each simulation. Thus, the step 3420 may also include calculating the mean and standard deviations of all the simulations of each incremental cell in the simulated rectangles. The step 3420 may also calculate a histogram of possible reserve results and display this to the user via the output device 130. The user of the system 100 may then use this output of the GLM simulation calculation 3400 to determine the most effective loss reserve for the insurance company.

It may be possible that a user of the system 100 decides that the losses described by the GLM simulation are not fully developed by the last development period in the loss triangle. In such a case, the user may input prospective DY decay information that results in additional columns being added onto the right of the rectangle. These prospective DY periods are similar to the n-year tail factor feature discussed above with respect to the chain ladder model, e.g., they allow the user to model payments beyond the final development year in the triangle. The steps for taking the prospective DY factors into account are not shown in GLM simulation calculation 3400, but those skilled in the art will understand that the steps for the prospective DY factors or any other additional feature described herein may be added as needed to the calculation 3400.

Figures 36, 37, 38:
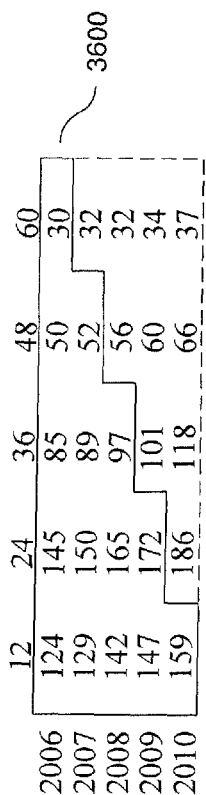
FIG. 36 shows an exemplary simulated incremental loss rectangle with a process variance applied for an insurance company.
FIG. 37 shows an exemplary development decay factor rectangle with prospective development periods for an insurance company.
FIG. 38 shows an exemplary fitted rectangle with prospective development periods for an insurance company.

FIG. 37 shows a DY rectangle 3700 using the example provided above, except that three prospective development periods D6, D7 and D8 have been attached to the previously generated DY rectangle. For the loss calculation purposes, these additional columns interact with the other design rectangles (AY, CY) in the exact same manner as the other columns in the triangles, i.e., multiply all the factors to get the ultimate loss or exposure adjusted ultimate loss. FIG. 38 shows the calculations to be performed to generate the fitted triangle with prospective development periods 3800.

The user may then select inputs for the Prospective DY trend mean. In this example, it may be considered that the user selected a 20% loss decay in the first year (D6=80%), a 25% loss decay in the second year (D7=75%), a 40% loss decay in the third year (D8=60%) and a 100% decay loss thereafter. The user may also select a standard deviation for the Prospective DY trend. Again, in this example, the standard deviation may be 10%, 12% and 15% for the first through third years, respectively. The selected means may then be used to calculate the fitted prospective calendar year decay and the standard deviation may be used to parameterize the simulation.

The simulated Prospective DY parameters are a random sample from a lognormal distribution with the means and standard deviations that are specified by the user. These simulations do not have any correlations with the other simulated parameters. Once the simulated parameters are generated, the simulated rectangles may be generated based on the techniques described above in the GLM simulations section.

In the above exemplary GLM calculation, the incremental values that were presented always were presented as positive or zero (0) values. However, it is noted that those skilled in the art should understand that negative incremental values may occur and the exemplary GLM calculation is capable of handling such negative incremental values. That is, the GLM calculation may be performed in the imaginary space to handle the negative incremental values, for example, a negative incremental value may be modeled as a complex number (a+bi). Once the GLM fitting calculations are completed, only the real number part of the fitted value (a) is used and the imaginary part (bi) is discarded. In this manner, the GLM calculation is able to account for a limited amount of negative incremental values. If there are too many negative incremental values, such that the total incremental paid amount between two development breaks is less than or equal to 0, the model will alert the user that there are too many negative incrementals in their data.

In the above example, the GLM calculation was used in a manner consistent with the chain ladder calculation. However, it should be understood by those skilled in the art that the GLM calculation is not intended to merely replicate the chain ladder calculation. That is, the exemplary embodiments allow a user to fully access advantages that may be associated with a GLM calculation versus a chain ladder calculation. For example, in a typical chain ladder calculation, there are unique parameters for each accident and development year. The GLM calculation of the exemplary embodiments may perform the loss reserve calculation with many less parameters. In one exemplary GLM calculation it may be allowed to provide four (4) or (5) parameters to perform the GLM calculation. That is, the user is allowed to specify the model in the GLM calculation and this specification may allow the user to provide many less parameters to perform the calculation.

As described above, the calculations performed by the system 100 may be for one or more lines of business for the insurance company. However, after the calculations have been performed for multiple lines of business, the system may also aggregate the data to result in a loss reserve for not just the single line of business, but the total loss reserve for several lines of business. The aggregation feature can be used in conjunction with both GLM and the chain ladder models (or any combination of the two models). The inputs for the aggregation calculation are the simulated rectangles from each triangle that is being aggregated and a correlation matrix. The triangles may be of different sizes and shapes, but the triangles should have the same "As of Date", and the same loss intervals—i.e., the triangle can be made up of monthly losses, quarterly losses, half-yearly losses or yearly losses. To aggregate, the triangles must all be yearly, or all quarterly, etc.

Prior to starting the exemplary calculation, it is noted that the exemplary calculation will use a correlation matrix to combine the lines of business. However, there are certain correlation matrices that are not allowed. For example, the below correlation matrix is not possible. T1 and T3 are perfectly correlated, T2 and T3 are perfectly correlated, so T1 and T2 would also need to be perfectly correlated, they cannot be inversely correlated. Example of impossible correlation matrix:

| Correlation Matrix | T1 | T2 | T3 |
|---|---|---|---|
| T1 | 1.00 | −1.00 | 1.00 |
| T2 | −1.00 | 1.00 | 1.00 |
| T3 | 1.00 | 1.00 | 1.00 |

This example is obviously hyperbolic. There are many possible ways a correlation matrix can be ill-specified. To correct this, a matrix transformation technique known as Spectral Decomposition is applied as follows:

$C$ = input correlation matrix $\Lambda$ = eigenvalue diagonal matrix(matrix of *eigenvalues* from the input matrix)

$S$ = Eigenvector matrix

-continued $\Lambda'$ = max(*eigenvalues*, 0)

$B' = S\sqrt{\Lambda'}$ $F$ = Normal Vector aka '*Frobenius*'

$b'_{i,j}$ = value in $i^{th}$ row and $j^{th}$ column in $B'$ $f_i$ = value in $i^{th}$ column of normal vector $F = \sqrt{\sum_{j=1}^{\cdot}(b'_{i,j})^2}$ $B = B'/F$ $\hat{C}$ = Adjusted correlation matrix = $BB^T$ After applying this transformation method, the correlation matrix will be valid for performing the aggregation calculation. In the below example correlation matrix, the adjusted matrix is the same as the input matrix. This means the input matrix is already a valid correlation matrix.

The following shows an exemplary correlation matrix, that will combine three lines of business:

| Correlation Matrix | T1 | T2 | T3 |
|---|---|---|---|
| T1 | 1.00 | 0.50 | 0.40 |
| T2 | 0.50 | 1.00 | 0.30 |
| T3 | 0.40 | 0.30 | 1.00 |

It is also considered that there are 10 simulations in this example. The simulations may then be ranked from smallest to largest, with respect to the size of the reserve, for example:

| T1 | T2 | T3 |
|---|---|---|
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 7 | 7 |
| 8 | 8 | 8 |
| 9 | 9 | 9 |
| 10 | 10 | 10 |

Then, based on the correlation matrix, the simulated rectangles may be reordered based on their rank. In this example, the simulated rectangles are reordered from a multivariate normal distribution using a Spearman Rank Correlation to relate ranks between different triangles, as follows:

$$\rho_{j,k} = \frac{\sum_i \tfrac{1}{\cdot}(T^{\cdot}_{i,j} - \overline{T}_j)\tfrac{1}{\cdot}(T^{\cdot}_{i,k} - \overline{T}_k)}{\sqrt{\sum_i \tfrac{1}{\cdot}(T^{\cdot}_{i,j} - T_j)^2 \sum_i \tfrac{1}{\cdot}(T^{\cdot}_{i,k} - T_k)^2}}$$

$\rho_{j,k}$ = Spearman Rank Correlation between $T_j$ and $T_k$ $T_{i,j}$=rank from triangle $T_j$
(i.e., i=5, j=3, $T_{5,3}$=rank of the $5^{th}$ simulation from T3=3 in the below example)
$T_j$=average rank of $j^{th}$ triangle (i.e. j=2, $T_2$=5.5 in the below example)

The result of this exemplary reordering is:

| T1 | T2 | T3 |
|----|----|----|
| 3  | 7  | 8  |
| 10 | 4  | 7  |
| 1  | 3  | 6  |
| 5  | 5  | 5  |
| 7  | 1  | 3  |
| 6  | 10 | 9  |
| 2  | 2  | 1  |
| 4  | 6  | 10 |
| 9  | 9  | 2  |
| 8  | 8  | 4  |

Figure 39:
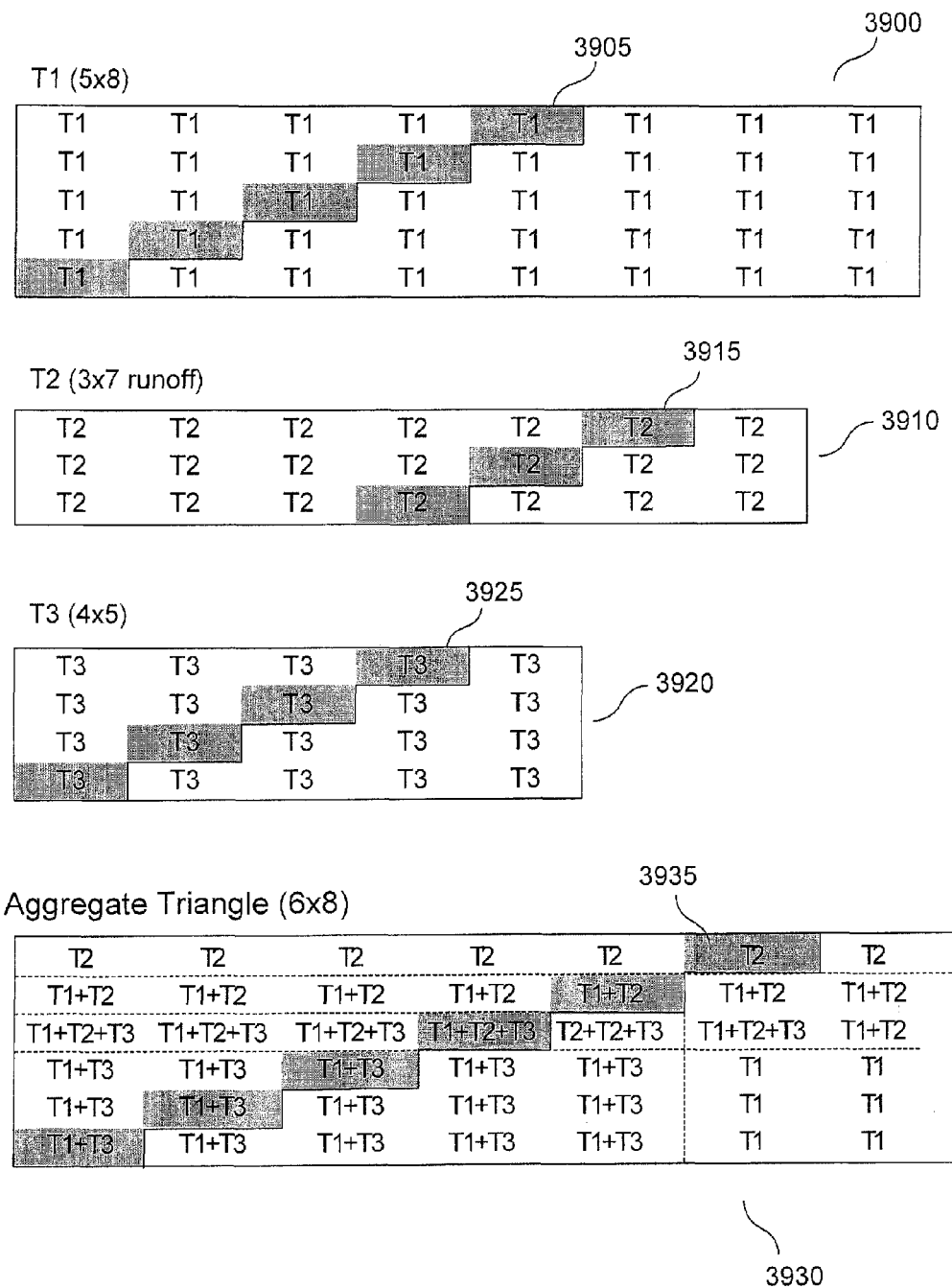
FIG. 39 shows three exemplary simulated rectangles and an aggregated rectangle created from the simulated rectangles.

The simulated rectangles may then be aggregated into an aggregated rectangle. This process is generally illustrated by the rectangles in FIG. 39. The first rectangle is the T1 rectangle 3900 and is a 5×8 rectangle. The second rectangle is the T2 rectangle 3910 and is a 3×7 rectangle. The third rectangle is the T3 rectangle 3920 and is a 4×5 rectangle. As shown in FIG. 39, each of the rectangles 3900, 3910 and 3920 include a highlighted diagonal 3905, 3915 and 3925, respectively. The aggregated rectangle 3930 is generated using the values form the individual rectangles 3900, 3910 and 3920, where the highlighted diagonals align for a given exposure year as shown by diagonal 3935.

After calculating the aggregated rectangle 3930, the mean, standard deviation and percentiles from the aggregated simulations may be calculated in the same manner described above for the chain ladder and GLM simulations.

The aggregation calculation also allows the user to scale each input triangle by a real number value before performing the aggregation calculation. This allows, for example, the ability to correlate two lines of business 100% and deduct one from the other—this is desirable when modeling salvage and subrogation and the loss separately. This feature also helps when combining triangles that are in different currencies.

The above aggregation is described for the ultimate-year risk. However, the aggregation may also be performed for the one-year risk value. That is, the one-year risk value for any particular line of business may be determined as described in the above calculations. This one-year risk value may then be aggregated with the corresponding one-year risk values for other lines of business in accordance with the aggregation calculation provided above.

Thus, the above has provided two exemplary manners (chain ladder model and GLM) of determining estimated loss reserves for a line of business based on the actual experience of the insurance company. As described above, the results of these calculations provide different data that may be used by the responsible individuals at the insurance company to select the proper loss reserve amounts. Each of these manners of determining the loss reserves or any other calculation method employed by the insurance company), may result in different answers. Thus, it is up to the responsible individuals to select the proper loss reserve based on the best available data. The above exemplary systems and methods provide insurance companies with an effective way to determine a best estimate of the loss reserves.

As was also described above, the exemplary embodiments are not limited to the two types of exemplary calculations provided herein. For example, another type of calculation may be an incurred chain ladder calculation. The data used for this type of calculation is the sum of the paid losses plus the claims adjustors' estimate of the payments yet to be made. This data may be supplied in the form of a triangle similar to the paid triangle 200. The incurred chain ladder calculations may the be performed using this incurred data in accordance with the principles described above for the chain ladder calculation, with certain exceptions and/or additions as described below.

The incurred chain ladder calculation also requires all the inputs for the paid chain ladder calculation because the paid chain ladder calculation will be run synchronously with the incurred chain ladder calculation. At each iteration, when the incurred chain ladder residuals are re-sampled, it is performed in a 100% correlated and synchronized way with the paid chain ladder residual re-sampling. For example, if the largest residual is chosen for a particular position in the simulated incurred triangle, then the largest residual from the paid triangle will also be chosen for that same position in the simulated paid triangle.

After the simulated incremental incurred loss rectangle is produced, then the ultimate loss by accident year is calculated. Using the same iteration in the paid loss rectangle, a payment pattern is calculated for each accident year, and used to calculate a payment stream from the ultimate loss by accident year from the incurred loss rectangle. It is then possible to calculate the loss reserve from this iteration.

As described above, the exemplary embodiments may be implemented as a spreadsheet program such as Excel. An advantage to such an implementation is that the users of the application may be accustomed to working in a spreadsheet to enter data such as is needed for input by the loss reserve calculation. In fact, the users may have to enter the data needed for the loss reserve calculations for reasons other than the loss reserve calculations. Thus, as will be described in greater detail below, an exemplary embodiment of the loss reserve calculation is a plug-in or add-in to a spreadsheet program that is transparent to the user such that a user may perform the loss reserve calculations on data in an existing spreadsheet without having to export or specially format the data for the loss reserve calculation.

In one exemplary embodiment, the loss reserve calculation is written in any language supported by the .net framework. The calculation software may then be input to a tool for creating Excel add-ins such as Excel DNA. This results in the loss reserve calculation software being formatted as an add-in to Excel, where a user may select the add-in. In the below example, this is the exemplary manner used to create the add-in. However, those skilled in the art will understand that different manners of creating an Excel add-in may be used and different spreadsheet programs may have different manners of handling plug-ins. These variations are intended to be included within the scope of the exemplary embodiments and the functionality of any variations will be consistent with the functionality of the described embodiment.

Thus, a user may be entering data into a spreadsheet as they normally would for various reasons associated with their job functions. The spreadsheet program (e.g., Excel) would operate in the manner as they are normally accustomed, e.g., the user would open the spreadsheet program by clicking on the Excel icon on their desktop, a new or previously populated workbook including various sheets would appear on the screen and the user may enter and/or manipulate the data in the workbook using the functionalities provided by the spreadsheet program.

Figure 40:
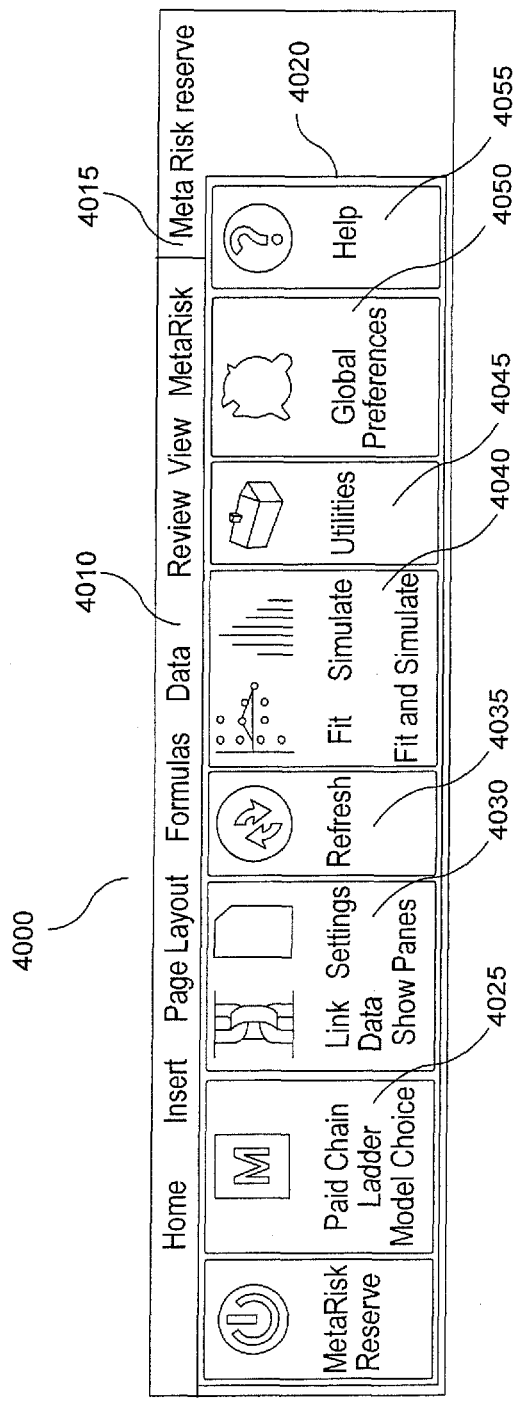
FIG. 40 shows an exemplary toolbar for a spreadsheet program that includes buttons related to a loss reserve calculation according to an exemplary embodiment.

However, in this example, the spreadsheet program has been augmented by an add-in to include the loss reserve calculation. FIG. 40 shows an exemplary toolbar 4000 for a spreadsheet program that includes buttons related to the loss reserve calculation. As shown in FIG. 40, the tabs 4010 are the same tabs that normally appear when a user is using an Excel spreadsheet. However, there is an extra tab 4015 labeled MetaRisk Reserve that is a tab for the loss reserve calculation. MetaRisk Reserve is a trade name owned by Guy Carpenter & Co., LLC, New York, N.Y. When a user selects the loss reserve calculation tab 4015, the buttons 4020 appear to the user. These buttons include a model button 4025, a pane button 4030, a refresh button 4035, a fit and simulate button 4040, a utilities button 4045, a global preferences button 4050 and a help button 4055. The functions of the refresh button 4035, utilities button 4045, global preferences button 4050 and help button 4055 should be readily apparent from their names and will not be discussed further.

The model button 4025 allows the user to select the type of model to be used in the loss reserve calculation. In this example, the user has selected a paid chain ladder model as indicated on button 4025. However, the button 4025 may include a drop down menu to select other types of models, e.g., GLM, etc.

Figure 41B:
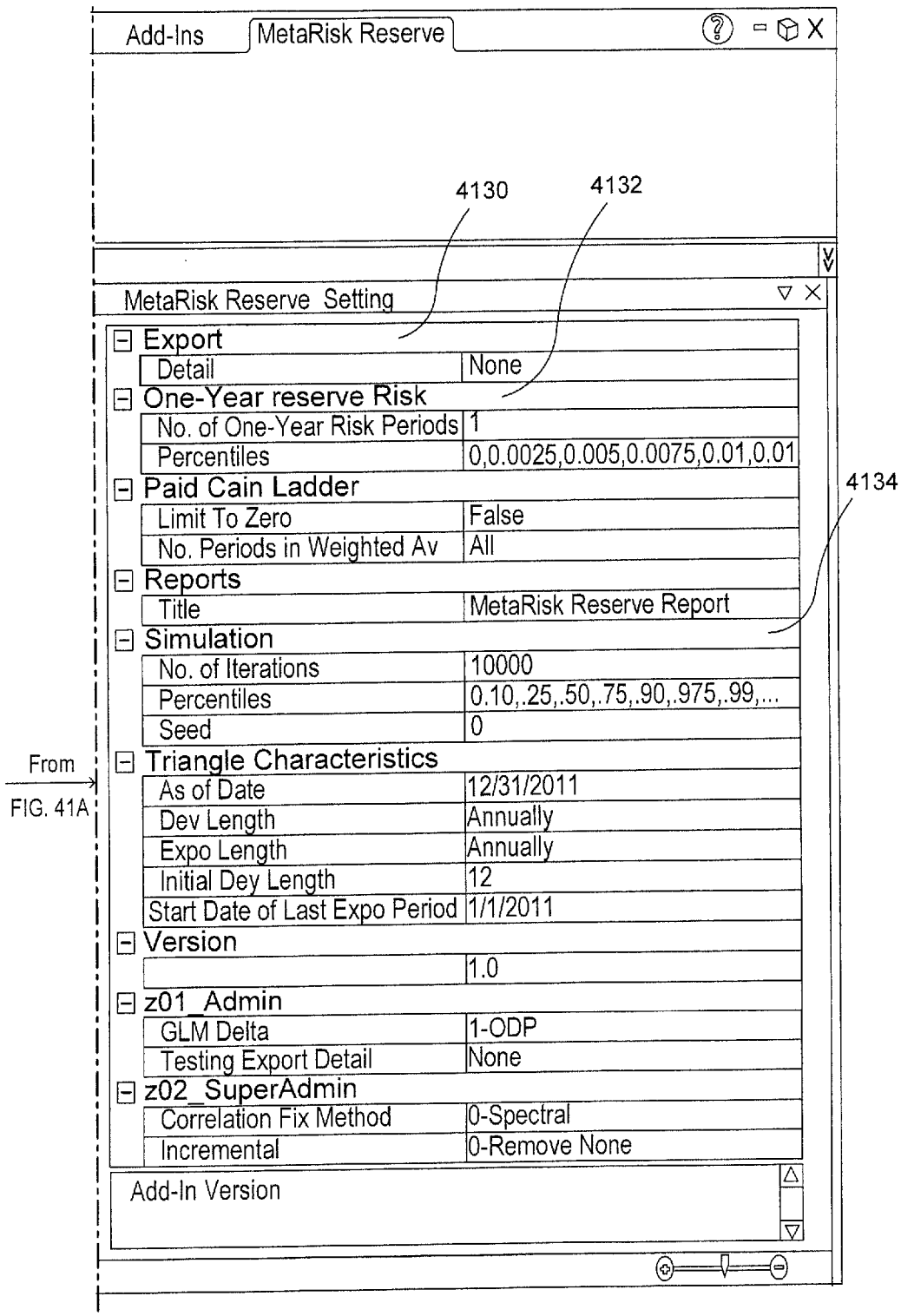
FIG. 41B shows a second portion of the exemplary spreadsheet view of FIG. 41A having a link data pane, a spreadsheet pane and a settings pane.

The pane button 4030 shows two functionalities, link data and settings. Each of these functionalities will be discussed with reference to FIG. 41 that shows a spreadsheet view 4100 having a link data pane 4110, a spreadsheet pane 4120 and a settings pane 4130. The spreadsheet pane 4120 is the normal workbook view of the spreadsheet. In this example, there is no data shown in the spreadsheet, but this is only exemplary and the user may have populated the spreadsheet with data and can continue to populate the spreadsheet via with data via pane 4120 when the other panes 4110 and 4130 are open.

The settings pane 4130 shows the loss reserve settings that may be set by the user for the particular loss reserve model that has been selected by the user. In this example, the user has selected the paid chain ladder model as shown by button 4025. Thus, the settings pane 4130 displays the user definable settings associated with the paid chain ladder model. If the user had selected a GLM model, different settings associated with the GLM model may appear in the settings pane 4130. To provide some exemplary settings, the one-year reserve risk 4132 was set to have one period and display the percentiles as shown in the settings pane 4130. The one-year reserve risk calculation was described in detail above. The simulation settings 4134 have been set to provide 10,000 simulations, with the percentiles of interest as shown and a seed of 0. Other exemplary settings are also shown in the settings pane 4130. It should be clear that these settings are associated with the chain ladder calculation described above and are the user settable portions of the calculation.

The user may set these settings and the data is saved into the workbook of the spreadsheet. It is noted that this setting data is saved with the workbook and is accessible each time the workbook file is opened. However, the setting data is not saved as a hidden sheet that is accessible to a user. The setting data is stored within the file structure so that a user does not have access to the setting data, except through the pane 4130, so there can be no tampering with the displayed setting data.

Similarly, the link data pane 4110 allows the user to easily select the data from the spreadsheet that should be used in the loss reserve calculation. As shown in the link data pane 4110, the user may highlight the paid triangle in the spreadsheet pane, and then doubleclick on the "paid triangle" words in the link data pane. In this manner, the user is not required to enter the data in any specific order or format into the spreadsheet. The user may enter the data into the spreadsheet in the manner to which they are accustomed. The link data pane 4110 allows the user, with a few simple button clicks, to select the data for the loss reserve calculation from any location within the spreadsheet. The link data pane 4110 also shows other data that may be entered by the user for the selected loss reserve calculation. This data was described above in the description of the specific exemplary calculations. The link data pane 4110 may also show whether the input data is required or optional for the selected loss reserve calculation. Thus, for optional data, the user may elect to select or not select data from the spreadsheet.

As described above, the loss reserve calculation software may include a minimum amount of data that is needed to effectively perform the loss reserve calculation, e.g., the described edge case of missing data in the cumulative paid triangle. Thus, if the user has not provided and/or selected the minimum amount of data needed by the selected model, the link data pane 4110 may display an indication that too little data has been selected and the additional data that is needed to perform the calculation. To provide an example from the GLM model, if the user's data includes too many negative incremental values as described above, the link data pane 4110 may provide an alert or indication of this to the user. In another example, the user may be provided with an alert if the model is over-parameterized (too many parameters) or ill-specified (parameters in the wrong location). The user may also automatically identify zero's or negative incremental losses from their input triangle and treat these values as missing.

In another example, as the user selects data (or after the calculation has started) the loss reserve calculation software may identify certain data values as outliers, e.g., a value in an incremental triangle. The loss reserve calculation software allows the user to identify an incremental value in the triangle as an outlier, meaning the user does not want to include this value in the analysis. For example, when the loss reserve calculation is performed, and the cumulative triangle is used to generate the incremental triangle, the incremental value that corresponds to the cell that was flagged as an outlier will be treated as missing for the purposes of all calculations.

Thus, the loss reserve calculation add-in allows the user to easily select both the settings and the complete set of data for the selected loss reserve calculation using the panes 4110, 4120 and 4130. In cases where the user has not properly selected the data and or settings, the loss reserve calculation add-in provides alerts to the user so that the correct data and/or settings may be selected to perform the selected loss reserve calculation.

Once this data has been entered by the user, the user may select the fit and simulate button 4040. As described above for the exemplary chain ladder and GLM calculations, the first step is to perform the fitting calculations on the paid data (e.g., by pressing the fit button) and then performing the simulations on the results of the fitting calculations (e.g., resampling with replacement). The results as described above for each of the calculations may then be displayed or output to the user based on the requested report type selected by the user.

The user may then tab back to other tabs of the spreadsheet program to continue working on the spreadsheet. In this manner, the loss reserve calculation becomes transparent to the user of the spreadsheet. The user does not need to open a new program or export data from the spreadsheet to another program, the user merely needs to click several buttons within the spreadsheet program to which they are accustomed and the loss reserve calculation is performed.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC QS, etc. In a further example, the exemplary embodiments of the calculation engine may be a program containing lines of code stored on a non-transitory computer readable storage medium that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A non-transitory computer readable storage medium storing a set of instructions executable by a processor, the instructions being operable to perform a method, comprising:
   receiving, from a user, a selection of a model to perform a loss reserve calculation;
   receiving, from the user, a selection of actual data directly from a workbook of a spreadsheet application to be input into the model selected to perform the loss reserve calculation, wherein the actual data is aggregated data for a plurality of insurance policies in a line of business;
   wherein the selection of actual data is a selection of aggregated data for the plurality of policies in the line of business;
   performing a model fitting calculation based on the selected model and the selected actual data to generate model fitted results;
   performing a plurality of simulations, wherein each simulation is based on the model fitted results and random re-sampling with replacement for the selected actual data; and
   generating loss reserve statistics based on the plurality of simulations for the line of business.

2. The computer readable storage medium of claim 1, wherein the selected model includes one of a chain ladder model, a generalized linear model, a Bornhuetter Ferguson model, or a Cape Cod model,
   wherein the selected actual data is actual aggregated paid loss data for each of a plurality of accident periods and each of a plurality of development periods.

3. The computer readable storage medium of claim 1, wherein the selected model includes an incurred chain ladder model, an incurred Bornhuetter Ferguson model, or an incurred Cape Cod model,
   wherein the selected actual data is aggregated actual paid loss data and an aggregated estimate of payments yet to be made for each of a plurality of accident periods and each of a plurality of development periods.

4. The computer readable storage medium of claim 1, wherein the method further comprises:
   receiving, from the user, a selection of a plurality of settings for the model; and
   storing the selected plurality of settings in a file of the workbook of the spreadsheet application.

5. The computer readable storage medium of claim 1, wherein the selection of the actual data directly from the workbook of the spreadsheet application, includes:
   receiving, from the user, a selection of a range of data from the workbook.

6. The computer readable storage medium of claim 1, wherein the selected model is one of a generalized linear model or an incurred generalized linear model and the method further comprises:
   receiving, from the user, a selection of prospective calendar periods trend values; and
   receiving, from the user, a selection of prospective development period trend values, wherein each of the plurality of simulations is further based on the prospective calendar period trend values and the prospective development period trend values.

7. The computer readable storage medium of claim 6, wherein the method further comprises:
   receiving, from the user, a selection of one of an over-dispersed Poisson distribution error term, a normal distribution error term, a gamma distribution error term or an inverse Gaussian distribution error term,
   wherein performing the model fitting calculation includes determining a variance covariance matrix based on the selected error term.

8. The computer readable storage medium of claim 7, wherein the method further comprises:
   comparing the model fitted results generated by the model fitting calculation using the selected error term to determine whether the model fitted results provide a good fit to the actual paid loss data;
   providing, to the user, a prompt to select another one of the error terms;
   receiving, from the user, a further selection of another one of the error terms; and
   performing the model fitting calculation including determining a variance covariance matrix based on the selected another one of the error terms.

9. The computer readable storage medium of claim 1, wherein the model fitted results include incremental actual paid loss data values for a plurality of accident periods and a plurality of development periods, wherein a portion of the incremental actual paid loss data values are negative values and wherein the model fitting calculation is performed in the imaginary space for the negative values.

10. The computer readable storage medium of claim 1, wherein the actual data includes edge cases which includes one of non-symmetrical data or missing data, and wherein the selected model includes edge case instructions for handling the edge cases.

11. The computer readable storage medium of claim 1, wherein the method further comprises:
   performing a one-year risk simulation for each of the simulations to generate a simulated change to a mean reserve estimate at one-year intervals.

12. The computer readable storage medium of claim 1, the method further comprising:
   generating loss reserve statistics for a further plurality of lines of business; and
   aggregating the loss reserve statistics for all lines of business for which loss reserve statistics have been generated.

13. The computer readable storage medium of claim 1, wherein the selected model is a chain ladder model and the method further comprises:
   receiving systemic risk values, wherein a portion of the plurality of simulations are further based on the systemic risk values.

14. The computer readable storage medium of claim 13, wherein the systemic risk values include a random sample from a gamma distribution with mean of one and a standard deviation parameterized by the user.

15. A method, comprising:
   receiving, from a user, a selection of a model to perform a loss reserve calculation;
   receiving, from the user, a selection of actual data directly from a workbook of a spreadsheet application to be input into the model selected to perform the loss reserve calculation, wherein the actual data is aggregated data for a plurality of insurance policies in a line of business;

wherein the selection of actual data is a selection of aggregated data for the plurality of policies in the line of business;

performing, by a processor, a model fitting calculation based on the selected model and the selected actual data to generate model fitted results;

performing, by the processor, a plurality of simulations, wherein each simulation is based on the model fitted results and random re-sampling with replacement for the selected actual data; and generating, by the processor, loss reserve statistics based on the plurality of simulations for the line of business.

16. A system, comprising:

a memory configured to store a plurality of models to perform a loss reserve calculation and a workbook of a spreadsheet application including actual data, wherein the actual data is aggregated data for a plurality of insurance policies in a line of business;

an input device configured to receive inputs from a user, the inputs including a selection of one of the plurality of models to perform the loss reserve calculation and a selection of a portion of the actual data directly from the workbook, wherein the selection of a portion of the actual data is the selection of aggregated data for the plurality of policies in the line of business; and a processor configured to receive the selections from the input device and perform a model fitting calculation based on the selected model and the selected actual data to generate model fitted results, the processor further configured to perform a plurality of simulations, wherein each simulation is based on the model fitted results and random re-sampling with replacement for the selected actual data and generate loss reserve statistics based on the plurality of simulations for the line of business.

17. The system of claim 16, wherein the processor is a personal computer type multiple core processor and the model fitting calculation and the plurality of simulations are broken up between the multiple cores of the processor.

18. The system of claim 16, further comprising:

an output device configured to output the loss reserve statistics to the user.

19. The system of claim 16, wherein the input device is further configured to receive a selection of a plurality of settings for the selected model and the memory is further configured to store the selected plurality of settings in a file of the workbook of the spreadsheet application.

20. The system of claim 16, wherein the input device is further configured to receive the selected actual data directly from the workbook of the spreadsheet application based on a selection of a range of data from the workbook by the user.

21. The system of claim 16, wherein the selected model is one of a generalized linear model or an incurred generalized linear model and the input device is further configured to receive a selection of prospective calendar period trend values and a selection of prospective development period trend values, wherein the processor is further configured to perform each of the plurality of simulations based on the prospective calendar period trend values and the prospective development period trend values.

22. The system of claim 21, wherein the input device is further configured to receive a selection of one of an overdispersed Poisson distribution error term, a normal distribution error term, a gamma distribution error term or an inverse Gaussian distribution error term, wherein the processor when performing the model fitting calculation includes determining a variance covariance matrix based on the selected error term.

23. The system of claim 16, wherein the selected actual data includes edge cases which includes one of non-symmetrical data or missing data, and wherein the selected model includes edge case instructions for handling the edge cases, wherein the processor performs the model fitting calculations and the plurality of simulations in accordance with the edge case instructions.

24. The system of claim 16, wherein the processor is further configured to perform a one-year risk simulation for each of the plurality of simulations to generate a simulated change to a mean reserve estimate at one-year intervals.

25. The system of claim 16, wherein the loss reserve statistics are generated for a line of business, the processor being further configured to generate loss reserve statistics for a further plurality of lines of business and aggregate the loss reserve statistics for all lines of business for which loss reserve statistics have been generated.

26. The computer readable storage medium of claim 1, wherein the loss reserve statistics include a development period trend, and accident period trend and a calendar period trend.

27. The computer readable storage medium of claim 26, wherein the method further comprises:

receiving assigned breaks from the user for each calendar period, development period and accident period, wherein the calculation of the development period trend, the accident period trend and the calendar period trend is further based on the corresponding user assigned breaks.

* * * * *